US012500451B2

(12) United States Patent
Stingu et al.

(10) Patent No.: US 12,500,451 B2
(45) Date of Patent: Dec. 16, 2025

(54) WIRELESS POWER TRANSMITTER AND RECEIVER

(71) Applicant: Spark Connected LLC, Dallas, TX (US)

(72) Inventors: Petru Emanuel Stingu, Dallas, TX (US); Malek Ramezani, Lynnwood, WA (US); Kenneth Moore, Dallas, TX (US); Ruwanga Dassanayake, Dallas, TX (US)

( * ) Notice: Subject to any disclaimer, the term of this patent is extended or adjusted under 35 U.S.C. 154(b) by 872 days.

(21) Appl. No.: 17/747,738

(22) Filed: May 18, 2022

(65) Prior Publication Data

US 2022/0376551 A1 Nov. 24, 2022

Related U.S. Application Data

(60) Provisional application No. 63/191,174, filed on May 20, 2021.

(51) Int. Cl.
*H02J 50/40* (2016.01)
*H02J 50/12* (2016.01)
(Continued)

(52) U.S. Cl.
CPC ............. *H02J 50/12* (2016.02); *H02J 50/40* (2016.02); *H02J 50/50* (2016.02); *H02J 50/80* (2016.02);
(Continued)

(58) Field of Classification Search
USPC .......................... 320/106, 107, 108, 109, 110
See application file for complete search history.

(56) References Cited

U.S. PATENT DOCUMENTS

| 3,376,578 A | 4/1968 | Sawyer |
|---|---|---|
| 3,735,231 A | 5/1973 | Sawyer |

(Continued)

FOREIGN PATENT DOCUMENTS

JP  2002009566 A  1/2022

OTHER PUBLICATIONS

Alqatamin, M. et al., "Current Control of a Three-Phase, Grid-Connected Inverter in the Presence of Unknown Grid Parameters without a Phase Locked Loop," IEEE Journal of Emerging and Selected Topics in Power Electronics, Jun. 25, 2020, 10 pages.

(Continued)

*Primary Examiner* — Brian Ngo

(57) ABSTRACT

In an embodiment, a wireless power transmitter includes: a master transmitter resonant tank configured to wirelessly transmit power to a receiver resonant tank; a master transmitter driver configured to drive the master transmitter resonant tank; a slave transmitter resonant tank; a slave transmitter driver configured to drive the slave transmitter resonant tank; and a controller configured to adjust an impedance seen by the master transmitter resonant tank by controlling the slave transmitter driver, where controlling the slave transmitter driver includes adjusting a phase angle between a slave transmitter current flowing through the slave transmitter resonant tank and a master transmitter current flowing through the master transmitter resonant tank or adjusting a slave supply voltage of the slave transmitter driver.

17 Claims, 22 Drawing Sheets

(51) Int. Cl.
- *H02J 50/50* (2016.01)
- *H02J 50/80* (2016.01)
- *H02M 3/158* (2006.01)

(52) U.S. Cl.
CPC ........ *H02M 3/1582* (2013.01); *H02M 3/1588* (2013.01)

(56) References Cited

U.S. PATENT DOCUMENTS

| | | | |
|---|---|---|---|
| 4,860,183 | A | 8/1989 | Maeda et al. |
| 5,051,875 | A | 9/1991 | Johnson |
| 5,434,504 | A | 7/1995 | Hollis et al. |
| 5,498,948 | A | 3/1996 | Bruni et al. |
| 6,175,169 | B1 | 1/2001 | Hollis, Jr. et al. |
| 6,184,628 | B1 | 2/2001 | Ruthenberg |
| 6,184,651 | B1 | 2/2001 | Fernandez et al. |
| 6,445,093 | B1 | 9/2002 | Binnard |
| 6,803,744 | B1 | 10/2004 | Sabo |
| 6,949,845 | B2 | 9/2005 | Oisugi et al. |
| 7,244,037 | B2 | 7/2007 | Koren |
| 8,049,370 | B2 | 11/2011 | Azancot et al. |
| 8,193,769 | B2 | 6/2012 | Azancot et al. |
| 8,957,549 | B2 | 2/2015 | Kesler et al. |
| 9,247,595 | B2 | 1/2016 | Fornage et al. |
| 9,590,444 | B2 | 3/2017 | Walley et al. |
| 9,800,191 | B2 | 10/2017 | Barsilai et al. |
| 9,853,441 | B2 | 12/2017 | Teggatz et al. |
| 10,054,622 | B2 | 8/2018 | Hernandez et al. |
| 10,079,090 | B2 | 9/2018 | Teggatz et al. |
| 10,168,443 | B2 | 1/2019 | Mangano et al. |
| 10,473,273 | B1 | 11/2019 | Zolotykh et al. |
| 10,714,976 | B2 | 7/2020 | Uchimoto |
| 10,983,153 | B1 | 4/2021 | Forood et al. |
| 11,199,715 | B2 | 12/2021 | Van Heugten |
| 11,637,452 | B2 * | 4/2023 | Danilovic ............... H02J 50/80 320/108 |
| 2006/0061323 | A1 | 3/2006 | Cheng et al. |
| 2009/0079387 | A1 | 3/2009 | Jin et al. |
| 2009/0127937 | A1 | 5/2009 | Widmer |
| 2009/0153098 | A1 | 6/2009 | Toya et al. |
| 2010/0033290 | A1 | 2/2010 | Liu et al. |
| 2010/0171369 | A1 | 7/2010 | Baarman et al. |
| 2010/0181841 | A1 | 7/2010 | Azancot et al. |
| 2010/0219183 | A1 | 9/2010 | Azancot et al. |
| 2010/0244579 | A1 | 9/2010 | Sogabe et al. |
| 2011/0050164 | A1 | 3/2011 | Partovi et al. |
| 2011/0062793 | A1 | 3/2011 | Azancot et al. |
| 2011/0074344 | A1 | 3/2011 | Park et al. |
| 2011/0121660 | A1 | 5/2011 | Azancot et al. |
| 2011/0156640 | A1 * | 6/2011 | Moshfeghi ............. H02J 50/12 320/108 |
| 2011/0227527 | A1 | 9/2011 | Zhu et al. |
| 2012/0032632 | A1 | 2/2012 | Soar |
| 2012/0112532 | A1 | 5/2012 | Kesler et al. |
| 2012/0235636 | A1 | 9/2012 | Partovi |
| 2013/0049484 | A1 | 2/2013 | Weissentern et al. |
| 2013/0082651 | A1 | 4/2013 | Park et al. |
| 2013/0257168 | A1 | 10/2013 | Singh |
| 2013/0257172 | A1 | 10/2013 | Teggatz et al. |
| 2013/0260676 | A1 | 10/2013 | Singh |
| 2013/0264973 | A1 | 10/2013 | Garg et al. |
| 2013/0285601 | A1 | 10/2013 | Sookprasong et al. |
| 2013/0300204 | A1 | 11/2013 | Partovi |
| 2014/0015329 | A1 | 1/2014 | Widmer et al. |
| 2014/0020312 | A1 | 1/2014 | Seiling et al. |
| 2014/0080409 | A1 | 3/2014 | Frankland et al. |
| 2014/0103869 | A1 | 4/2014 | Radovic et al. |
| 2014/0119082 | A1 | 5/2014 | Mueck et al. |
| 2014/0159501 | A1 | 6/2014 | Kanno et al. |
| 2014/0184150 | A1 | 7/2014 | Walley |
| 2014/0191568 | A1 | 7/2014 | Partovi |
| 2015/0054454 | A1 | 2/2015 | White, II et al. |
| 2015/0115877 | A1 | 4/2015 | Arai et al. |
| 2015/0142348 | A1 | 5/2015 | Huang et al. |
| 2015/0233987 | A1 | 8/2015 | Von Novak, III et al. |
| 2015/0249484 | A1 | 9/2015 | Mach et al. |
| 2015/0333797 | A1 | 11/2015 | Nejatali et al. |
| 2015/0341087 | A1 | 11/2015 | Moore et al. |
| 2015/0349542 | A1 | 12/2015 | Yamamoto et al. |
| 2015/0364944 | A1 | 12/2015 | Garcia Briz et al. |
| 2016/0094048 | A1 | 3/2016 | Bae |
| 2016/0094051 | A1 | 3/2016 | Soar |
| 2016/0118806 | A1 | 4/2016 | Standke et al. |
| 2016/0149440 | A1 | 5/2016 | Staring et al. |
| 2016/0161288 | A1 | 6/2016 | Lu |
| 2016/0172891 | A1 | 6/2016 | Filippenko et al. |
| 2016/0190852 | A1 | 6/2016 | Chiang et al. |
| 2016/0226296 | A1 | 8/2016 | Bae et al. |
| 2016/0336804 | A1 | 11/2016 | Son et al. |
| 2016/0336809 | A1 | 11/2016 | Gluzman et al. |
| 2016/0380471 | A1 * | 12/2016 | Moshfeghi ........... H04B 1/3838 320/108 |
| 2017/0033591 | A1 * | 2/2017 | Govindaraj ............. H02J 50/10 |
| 2017/0040843 | A1 | 2/2017 | Asanuma et al. |
| 2017/0077837 | A1 | 3/2017 | Gu et al. |
| 2017/0163100 | A1 | 6/2017 | Vocke et al. |
| 2017/0250578 | A1 | 8/2017 | Kallman |
| 2017/0274788 | A1 | 9/2017 | Zhang et al. |
| 2017/0279306 | A1 | 9/2017 | Elad et al. |
| 2017/0294798 | A1 | 10/2017 | Yuk et al. |
| 2017/0310166 | A1 | 10/2017 | Huang et al. |
| 2017/0346348 | A1 | 11/2017 | Lethellier et al. |
| 2018/0014709 | A1 | 1/2018 | O'Brien et al. |
| 2018/0115197 | A1 | 4/2018 | Li et al. |
| 2018/0131218 | A1 | 5/2018 | Shellhammer et al. |
| 2018/0166881 | A1 | 6/2018 | Suryanarayana et al. |
| 2018/0219428 | A1 | 8/2018 | Bae |
| 2018/0226938 | A1 | 8/2018 | Kuisma |
| 2018/0262065 | A1 | 9/2018 | Weidner |
| 2018/0272130 | A1 | 9/2018 | Meskens et al. |
| 2018/0301942 | A1 | 10/2018 | Brohlin et al. |
| 2018/0342907 | A1 | 11/2018 | Dimke et al. |
| 2019/0045676 | A1 | 2/2019 | Lee et al. |
| 2019/0068001 | A1 | 2/2019 | Lovas et al. |
| 2019/0097448 | A1 | 3/2019 | Partovi |
| 2019/0109498 | A1 | 4/2019 | Stingu et al. |
| 2019/0190320 | A1 | 6/2019 | Park |
| 2019/0214842 | A1 | 7/2019 | Wheeland et al. |
| 2019/0296590 | A1 | 9/2019 | Chae |
| 2019/0319494 | A1 | 10/2019 | Park et al. |
| 2019/0329653 | A1 | 10/2019 | Ueta |
| 2019/0334388 | A1 | 10/2019 | Van Wageningen et al. |
| 2019/0363584 | A1 | 11/2019 | Leem |
| 2020/0259369 | A1 | 8/2020 | Stingu et al. |
| 2020/0313471 | A1 | 10/2020 | Stingu et al. |

OTHER PUBLICATIONS

Bartsch, A., "The Intelligent Mouthguard: A Valid Tool to Meet Demand for Accurate, Precise Head Impact Data," Consult QD, Neurosciences, Advancing Patient Care, Nov. 10, 2015, 6 pages.

Consumer Reports, "Wireless Charging Pad Review," https://www.consumerreports.org/cro/news/2013/10/wireless-charging-pad-reviews/index.htm, Dec. 11, 2013, 5 pages.

Digi-Key Electronics, "Inductive Versus Resonant Wireless Charging: A Truce May Be a Designer's Best Choice," Aug. 2, 2016, 8 pages.

Gao, X., "Demodulating Communication Signals of Qi-Compliant Low-Power Wireless Charger Using MC56F8006 DSC," Freescale Semiconductor, Application Note, AN4701, Mar. 2013, 21 pages.

Gati, E. et al., "Wireless Phase-Locked Loop Control for Inductive Power Transfer Systems," IEEE, May 11, 2015, 7 pages.

Hayward Pool Products, "160 & 320 ColorLogic and CrystaLogic 1.5" LED Lights—LED Light Fixtures", Owner's Manual, RevF 092532, Hayward Pool Products, 2019, 28 pages.

Jansen, J. W., "Overview of Analytical Models for the Design of Linear and Planar Motors," IEEE Transactions on Magnetics, vol. 50, No. 11, Nov. 2014, 8 pages.

Johns, B. et al., "Adapting Qi-Compliant Wireless-Power Solutions to Low-Power Wearable Products," Texas Instruments, Power Management, Analog Applications Journal, Jun. 9, 2014, 7 pages.

(56) References Cited

OTHER PUBLICATIONS

Lynch, Brian T., "Under the Hood of a DC/DC Boost Converter", Texas Instruments, Power Supply Design Seminar, Paper SEM1800, Dallas, TX, USA, 2008-2009, 26 pages.
On Semiconductor, "90W Type-C PD3.0 / QC4.0 Power Adapter Solution with WT6636F," DN05125/D, May 2020, 24 pages.
On Semiconductor, "Secondary Side Synchronous Rectification Driver for High Efficiency SMPS Topologies," NCP4306, Mar. 2020, 52 pages.
Pentair, "Intellibrite 5G White and Color Pool and Spa Lights", www.pentair.com, Installation and User's Guide, 2019, 97 pages.
Power Electronics, "Qi-Compatible Wireless Charging A11 Type Tx Coil for 5V Applications," Sep. 27, 2016, 11 pages.
Rice, J., "Examining Wireless Power Transfer," Texas Instruments, 2014/15 Power Supply Design Seminar, 2015, 38 pages.
Skjellnes, A. et al., "Phase-locked loop control of thyristor converters," Proc. IEE, vol. 123, No. 10, Oct. 1976, 3 pages.
So, A., "This Smart Mouthguard Can Monitor Concussions," Wired, https://www.wired.com/story/this-smart-mouthguard-can-monitor-concussions/, Mar. 1, 2018, 7 pages.
Texas Instruments "Industry-Leading Wireless Power Solutions—The Most Widely Adopted in the Market", ti.com/wirelesspower, SLYT485C, 2013, 3 pages.
Texas Instruments, "Introduction to Wireless Power", QI WPC 1.1 compliant, www.ti.com/wirelesspower, 2016, 49 pages.
Texas Instruments, "LC Sensor Rotation Detection With MSP430 Extended Scan Interface (ESI)," Application Report, SLAA639, Jul. 2014, 33 pages.
Waters, B. et al., "Optimal Coil Size Ratios for Wireless Power Transfer Applications," IEEE, Jul. 28, 2014, 4 pages.
Wikipedia, "Electromagnetic coil", https://en.wikipedia.org/w/index.php?title=Electromagnetic_coil&oldid=776415501, Apr. 2017, 6 pages.
Wikipedia, "Inductive charging", https://en.wikipedia.org/w/index.php?title=Inductive_charging&oldid=802615270, Sep. 2017, 7 pages.
Wikipedia, "Qi (standard)", https://en.wikipedia.org/w/index.php?title=Qi_(standard)&oldid=803427516, Oct. 2017, 5 pages.
Wikipedia, "Phase-locked loop," https://en.wikipedia.org/wiki/Phase-locked_loop, Sep. 22, 2020, 17 pages.
Wireless Power Consortium, "Introduction to the Power Class 0 Specification," Version 1.2.3, Feb. 2017, 16 pages.
Wireless Power Consortium, "The Qi Power Transfer System Power Class 0 Specification—Parts 1 and 2: Interface Definitions", Version 1.2.3, Feb. 2017, 165 pages.
Zens, "Zens First Worldwide to Introduce Built-In Wireless (Sub-)Surface Charger with Apple and Samsung Fast Charge," https://www.makezens.com/article/zens-first-worldwide-introduce-built-wireless-sub-surface-charger-apple-samsung-fast-charge/, Mar. 23, 2018, 5 pages.

* cited by examiner top view top view front view side view

WIRELESS POWER TRANSMITTER AND RECEIVER

CROSS-REFERENCE TO RELATED APPLICATIONS

This application claims the benefit of U.S. Provisional Application No. 63/191,174, entitled "Wireless Power Transmitter and Receiver," and filed on May 20, 2021, which application is hereby incorporated herein by reference.

TECHNICAL FIELD

The present disclosure relates generally to an electronic system and method, and, in particular embodiments, to a wireless power transmitter and receiver.

BACKGROUND

Wireless charging systems are becoming ubiquitous in today's society. For example, many smartphones and wearables implement wireless charging technology. Ease of use, greater reliability, spatial freedom, reduced connectors and openings, and the possibility of hermetically sealing are among the benefits offered by wireless charging. Wireless charging standards allow for interoperability between different devices and manufacturers. Some wireless charging standards, such as the Qi standard from the Wireless Power Consortium, and standards promoted by the AirFuel alliance, are becoming widely adopted. The Qi standard uses inductive charging operating between 80 kHz and 300 kHz to wirelessly transmit power from a transmitter to a receiver. Standards promoted by the AirFuel alliance use resonant wireless charging operating at 6.78 MHz to wirelessly transmit power from a transmitter to a receiver.

FIG. 1 shows a schematic diagram of exemplary wireless charging system 100. Wireless charging system 100 includes a transmitter (TX) device 102 that includes a transmitting coil $L_{TX}$, and a receiver (RX) device 104 that includes a receiving coil $L_{RX}$. The efficiency of the wireless power transmission generally depends on the coupling between the coil $L_{TX}$ and coil $L_{RX}$. The coupling between the transmitting coil $L_{TX}$ and the receiving coil $L_{RX}$ is generally based on the relative position between the transmitting coil $L_{TX}$ and the receiving coil $L_{RX}$.

SUMMARY

In accordance with an embodiment, a wireless power transmitter includes: a master transmitter resonant tank configured to wirelessly transmit power to a receiver resonant tank; a master transmitter driver configured to drive the master transmitter resonant tank; a slave transmitter resonant tank; a slave transmitter driver configured to drive the slave transmitter resonant tank; and a controller configured to adjust an impedance seen by the master transmitter resonant tank by controlling the slave transmitter driver, where controlling the slave transmitter driver includes adjusting a phase angle between a slave transmitter current flowing through the slave transmitter resonant tank and a master transmitter current flowing through the master transmitter resonant tank or adjusting a slave supply voltage of the slave transmitter driver.

In accordance with an embodiment, a wireless power receiver includes: a receiver resonant tank configured to wirelessly receive power from a transmitter resonant tank; a tunable capacitor coupled to the receiver resonant tank, the tunable capacitor having a default capacitance; a rectifier coupled to the receiver resonant tank and to the tunable capacitor; a boost converter coupled to an output of the rectifier; and a controller, where, during startup, the boost converter is configured to power the controller, and the controller is configured to adjust the tunable capacitor to move a resonance frequency towards an operating frequency of a transmitter current flowing through the transmitter resonant tank, where the controller is configured to turn off the boost converter after adjusting the tunable capacitor.

In accordance with an embodiment, a controller is configured to be coupled to a master transmitter driver for driving a master transmitter resonant tank and to a slave transmitter driver for driving a slave transmitter resonant tank. The controller is configured to: cause a change in an amplitude of a slave current flowing through the slave transmitter resonant tank or a change in phase of the slave current with respect to a master current flowing through the master transmitter resonant tank so as to cause a change in phase angle between the master current and a master voltage across the master transmitter resonant tank and a change in absolute value of the master voltage over the master current.

In accordance with an embodiment, a method includes: wirelessly transmitting power to a receiver resonant tank of a wireless power receiver by driving a master transmitter resonant tank; determining a master impedance associated with the master transmitter resonant tank; and adjusting a phase angle between a slave transmitter current flowing through a slave transmitter resonant tank and a master transmitter current flowing through the master transmitter resonant tank or adjusting a slave voltage across the slave transmitter resonant tank to cause a change in the master impedance towards a target impedance.

In accordance with an embodiment, a wireless power transmitter includes: a master transmitter resonant tank; a master transmitter driver configured to drive the master transmitter resonant tank; a slave transmitter resonant tank; a slave transmitter driver configured to drive the slave transmitter resonant tank; a repeater coil configured to receive energy from the master transmitter resonant tank and wirelessly transmit power to a receiver resonant tank; and a controller configured to adjust an impedance associated with the repeater coil by controlling the slave transmitter driver, where controlling the slave transmitter driver includes adjusting a phase angle between a slave transmitter current flowing through the slave transmitter resonant tank and a repeater current flowing through the repeater coil or adjusting a slave supply voltage of the slave transmitter driver.

In accordance with an embodiment, a wireless power transmitter includes: a master transmitter driver configured to drive a master energy storage element; a slave transmitter driver configured to drive a slave energy storage element; a repeater coil configured to receive energy from the master transmitter driver via the master energy storage element and wirelessly transmit power to a receiver resonant tank; and a controller configured to adjust an impedance associated with the master energy storage element or the repeater coil by controlling the slave transmitter driver, where controlling the slave transmitter driver includes adjusting a phase angle between a slave transmitter current flowing through the slave energy storage element and a master transmitter current flowing through the master energy storage element, adjusting a phase angle between the slave transmitter current and a master repeater current flowing through the repeater coil, or adjusting a slave supply voltage of the slave transmitter driver.

In accordance with an embodiment, a device includes: a receiver resonant tank; a master transmitter resonant tank; a master transmitter driver configured to drive the master transmitter resonant tank; a slave transmitter resonant tank; a slave transmitter driver configured to drive the slave transmitter resonant tank; a repeater coil configured to receive energy from the master transmitter resonant tank and wirelessly transmit power to a receiver resonant tank; and a controller configured to adjust an impedance seen by the master transmitter resonant tank or an impedance associated with the repeater coil by controlling the slave transmitter driver, where controlling the slave transmitter driver includes adjusting a phase angle between a slave transmitter current flowing through the slave transmitter resonant tank and a master transmitter current flowing through the master transmitter resonant tank, adjusting a phase angle between the slave transmitter current and a master repeater current flowing through the repeater coil, or adjusting a slave supply voltage of the slave transmitter driver.

In accordance with an embodiment, a wireless power transmitter includes: a master transmitter resonant tank; a master transmitter driver configured to drive the master transmitter resonant tank; and a plurality of partially overlapping repeater coils configured to receive power from the master transmitter resonant tank and transmit power to a receiver resonant tank, where each of the plurality of repeater coils is configured to be detuned when the receiver resonant tank is not within a charging area of the plurality of repeater coils.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

Figure 1:
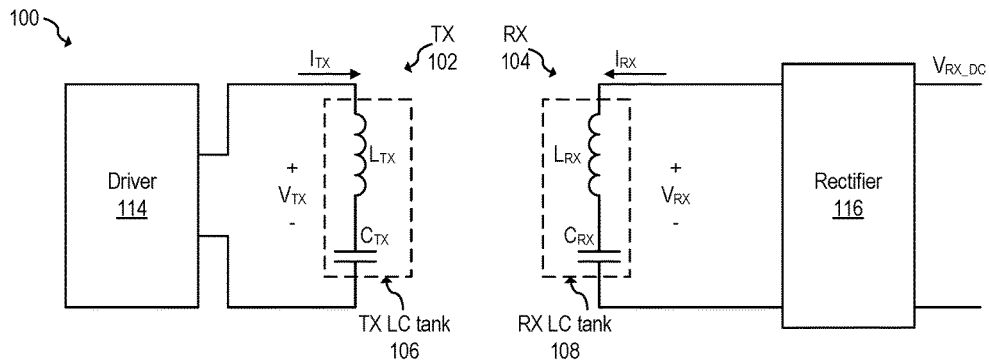
FIG. 1 shows a schematic diagram of an exemplary wireless charging system.

The making and using of the embodiments disclosed are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The description below illustrates the various specific details to provide an in-depth understanding of several example embodiments according to the description. The embodiments may be obtained without one or more of the specific details, or with other methods, components, materials and the like. In other cases, known structures, materials or operations are not shown or described in detail so as not to obscure the different aspects of the embodiments. References to "an embodiment" in this description indicate that a particular configuration, structure or feature described in relation to the embodiment is included in at least one embodiment. Consequently, phrases such as "in one embodiment" that may appear at different points of the present description do not necessarily refer exactly to the same embodiment. Furthermore, specific formations, structures or features may be combined in any appropriate manner in one or more embodiments.

It is understood that the term wireless charging is not limited to the charging of a battery, but includes wireless power transmission generally, unless stated otherwise.

Embodiments of the present invention will be described in a specific context, a wireless power transmission system using resonant wireless power transmission, e.g., based on a standard promoted by the AirFuel alliance (e.g., with a fixed operating frequency of 6.78 MHz). Some embodiments may be implemented without complying or without fully complying with a standard promoted by the AirFuel alliance, may operate with fixed frequencies different than 6.78 MHz, and/or may operate with variable frequencies. Some embodiments may comply with a different standard, such as a Qi standard.

Some embodiments may be implemented in applications in which the distance between the transmitting coil $L_{TX}$ and the receiving coil $L_{RX}$ is fixed after installation, such as a doorbell (in which the receiving coil $L_{RX}$ is disposed on one side of a wall, e.g., outside the house, and the transmitting coil $L_{TX}$ is disposed on the other side of the wall, e.g., inside the house). Other applications are also possible. For example, some embodiments may be implemented in applications in which the distance between the transmitting coil $L_{TX}$ and the receiving coil $L_{RX}$ is not fixed, such as in a wireless charger for a mobile phone.

In an embodiment of the present invention, a wireless power transmitter includes a master transmitter (TX) and a slave TX. The wireless power transmitter dynamically adjusts the impedance seen by the master TX by controlling the slave TX. By dynamically adjusting the impedance seen by the master TX, some embodiments are advantageously capable of transmitting wireless power through low coupling between the transmitting coil and the receiving coil, such as transmitting wireless power over a relatively long distance.

In some embodiments, the wireless power receiver tunes its resonance frequency to improve wireless power transmission between the wireless power transmitter and the wireless power receiver by controlling a variable capacitor. In some embodiments, a default factory setting for the tunable capacitor causes the resonance frequency of the receiver LC tank to be close to the operating frequency of the wireless power transmitter during startup to improve (increase) the magnitude of the voltage received from the wireless power transmitter. A boost converter is used to boost the received voltage to power a microcontroller that is used to dynamically adjust the variable capacitor to further tune the resonance frequency to be close to the operating frequency of the wireless power transmitter.

Generally, the coupling between the transmitting coil $L_{TX}$ and the receiving coil $L_{RX}$ is lower as the distance between the transmitting coil $L_{TX}$ and the receiving coil $L_{RX}$ increases. For example, for a resonant wireless charger, good coupling may be achieved when the receiving coil $L_{RX}$ is closer than the radius of the transmitting coil $L_{TX}$. For example, if the radius of the transmitting coil $L_{TX}$ is 3 inches, good coupling between the transmitting coil $L_{TX}$ and the receiving coil $L_{RX}$ may be achieved when the receiving coil $L_{RX}$ is closer than 3 in from the transmitting coil $L_{TX}$.

Low coupling may be the result of a long distance between the transmitting coil $L_{TX}$ and the receiving coil $L_{RX}$. For example, for a resonant wireless charger, a distance between the transmitting coil $L_{TX}$ and the receiving coil $L_{RX}$ that is longer than the radius of the transmitting coil $L_{TX}$ may result in low coupling. For example, if the radius of the transmitting coil $L_{TX}$ is 3 inches, a distance of 6 in between the transmitting coil $L_{TX}$ and the receiving coil $L_{RX}$ may result in low coupling.

Low coupling may also be caused by a material disposed between the transmitting coil $L_{TX}$ and the receiving coil $L_{RX}$. For example, windows coated with low-e coating, also known as low-e windows, may cause low coupling between a transmitting coil $L_{TX}$ disposed on one side of the window, and a receiving coil $L_{RX}$ disposed in the other side of the window.

To overcome low coupling between the transmitting coil $L_{TX}$ and the receiving coil $L_{RX}$, some embodiments use high quality (Q) factor for the TX LC tank and the RX LC tank. High Q resonant tanks are highly selective, and the resonance may shift as the impedance seen by the tank changes. Thus, some embodiments, dynamically tune the impedance seen by the wireless power transmitter to compensate for shifts in the resonance of the TX LC tank.

Figure 2:
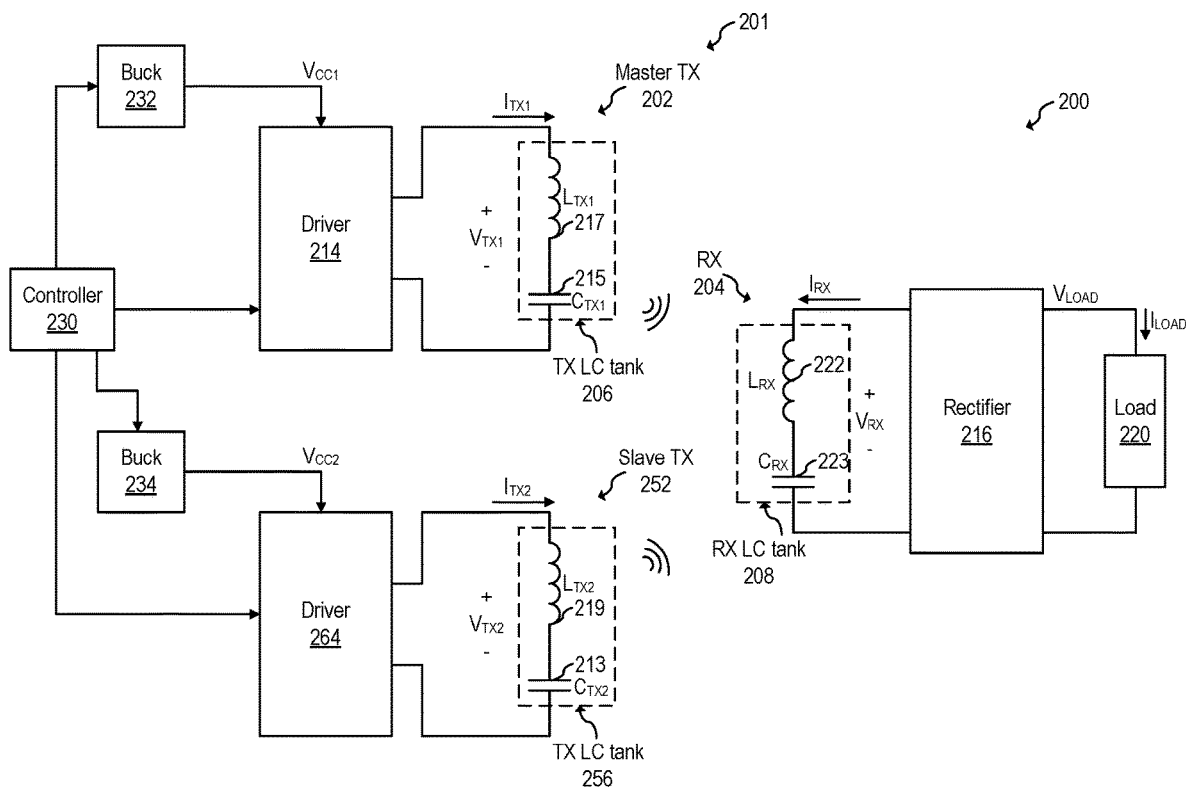
FIG. 2 shows a schematic diagram of a wireless power transfer system, according to an embodiment of the present invention.

FIG. 2 shows a schematic diagram of wireless power transfer system 200, according to an embodiment of the present invention. Wireless power transfer system 200 includes master wireless power transmitter 202, slave wireless power transmitter 252, and wireless power receiver 204. Master wireless power transmitter 202 includes driver 214 and resonant tank 206, which includes transmitting coil 217 and capacitor 215. Slave wireless power transmitter 252 includes driver 264 and resonant tank 256, which includes transmitting coil 219 and capacitor 213. Wireless power receiver 204 includes rectifier 216 and resonant tank 208, which includes receiving coil $L_{RX}$ and capacitor $C_{RX}$. In some embodiments, wireless power receiver 204 powers load 220.

As shown in FIG. 2, wireless power transmitters 202 and 252 may be implemented as part wireless power transmitter device 201, which also includes controller 230, and buck converters 232 and 234. Power transmitter device 201 may be implemented, e.g., in a printed circuit board (PCB).

[0050] During normal operation, buck converters 232 and 234 provide power to drivers 214 and 264, respectively. Drivers 214 and 264 drive resonant tanks 206 and 256, respectively, to wirelessly transmit power, e.g., to wireless power receiver 204. As shown in FIG. 2, master wireless power transmitter 202 (also referred to as mater TX 202) and slave wireless power transmitter 252 (also referred to as slave TX 252) both transmit (e.g., simultaneously, and, e.g., directly) wireless power to wireless power receiver 204.

As shown in FIG. 2, in some embodiments, $V_{cc1}$ may be supplied by a first converter (e.g., 232) and $V_{cc2}$ may be supplied by a second converter (e.g., 234). In some embodiments, the same converter supplies $V_{cc1}$ and $V_{cc2}$. In some embodiments, $V_{cc1}$ and $V_{cc2}$ are connected to the same output of the converter.

As shown in FIG. 2, in some embodiments, converters 232 and 234 may be implemented as buck converters. In some embodiments, converters 232 and 234 may be implemented as a switching power converter of a different type, such as a boost, buck-boost, flyback, etc. Other implementations are possible. For example, in some embodiments, converters 232 and 234 may be implemented as a non-switching power converter, such as a linear power converter.

In some embodiments, the converters (e.g., 232, 234) powering drivers 214 and 264 operate as switching (e.g., buck) converters in continuous conduction mode, which may advantageously increase the efficiency of the wireless power transmitters (202 and 252), e.g., by recirculating at least some of the power that is transferred from master TX 202 to slave TX 252.

In some embodiments, drivers 214 and 264 may be implemented with a push-pull architecture, such as with a class-D amplifier. In other embodiments, drivers 214 and 264 may be implemented with a class-E. Other implementations are also possible.

In some embodiments, drivers 214 and 264 may both be implemented with a full-bridge. In some embodiments, drivers 214 and 264 may both be implemented with a half-bridge. In some embodiments, one of drivers 214 and 264 may be implemented with a full-bridge and the other one of drivers 214 and 264 may be implemented with a half-bridge. Other implementations are also possible.

In some embodiments, controller 230 controls driver 214 and 264 and buck converters 232 and 234. In some embodiments, controller 230 monitors one or more signals of master TX 202 and slave TX 252 (e.g., $I_{TX1}$, $I_{TX2}$, $V_{TX1}$ and/or $V_{TX2}$) and control drivers 214 and 264 based on the monitored signals. In some embodiments, controller 230 may control drivers 214 and 264 based on information received from wireless power receiver 204, such as information based on $I_{RX}$ and $V_{RX}$.

In some embodiments, controller 230 may be implemented, e.g., as a custom or generic processor or controller coupled to a memory and configured to execute instructions stored in the memory. In some embodiments, controller 230 includes a finite state machine (FSM). Other implementations are also possible.

In some embodiments, transmitting coil 217 has a rectangular shape of, e.g., 3.5 in×4.5 in, e.g., such that the transmitting coil 217 fits under a conventional cover of a light switch. In some embodiments, transmitting coil 217 has a rectangular shape of, e.g., 7 in×4.5 in, e.g., such that the transmitting coil 217 fits under a conventional cover of a double light switch. Other dimensions and shapes may also be used.

In some embodiments, resonant tanks 206 and/or 208 are implemented with discrete capacitors 215 and 213, respectively. In some embodiments, resonant tanks 206 and/or 208 are implemented with self-resonant coils. For example, in some embodiments, resonant tank 206 is implemented with capacitor 215 as part of coil 217, in which the capacitance $C_{TX1}$ is implemented as a thin film capacitor or a multi-layer ceramic capacitor (MLCC) in a coil shape to achieve a self-resonating coil. In some embodiments, resonant tank 208 is implemented with capacitor 213 as part of coil 219, in which the capacitance $C_{TX2}$ is implemented as a thin film capacitor or a MLCC in a coil shape to achieve a self-resonating coil.

In some embodiments, rectifier 216 may be implemented in any way known in the art. For example, in some embodiments, rectifier 216 may be implemented as a passive bridge (e.g., using diodes). In some embodiments, rectifier 216 may be implemented as an active bridge (e.g., using synchronous rectification). Other implementations are also possible.

In some embodiments, load 220 may be a microcontroller. Other loads, instead of, or in addition to a microcontroller, may also be implemented. For example, in some embodiments, load 220 may include a boost converter powering the microcontroller. As another example, in some embodiments, load 220 may include a battery charger (e.g., powered by the boost converter).

FIGS. 3A-3D show waveforms associated with wireless power transfer system 200, according to an embodiment of the present invention. FIGS. 3A-3D show current $I_{TX1}$ flowing through LC tank 206, current $I_{TX2}$ flowing through LC tank 256, current $I_{LOAD}$ flowing through load 220, voltage $V_{LOAD}$ supplied to load 220, and power $P_{LOAD}$ supplied to load 220. FIGS. 3A-3D assume no coupling between master TX 202 and slave TX 252.

Figure 3A:
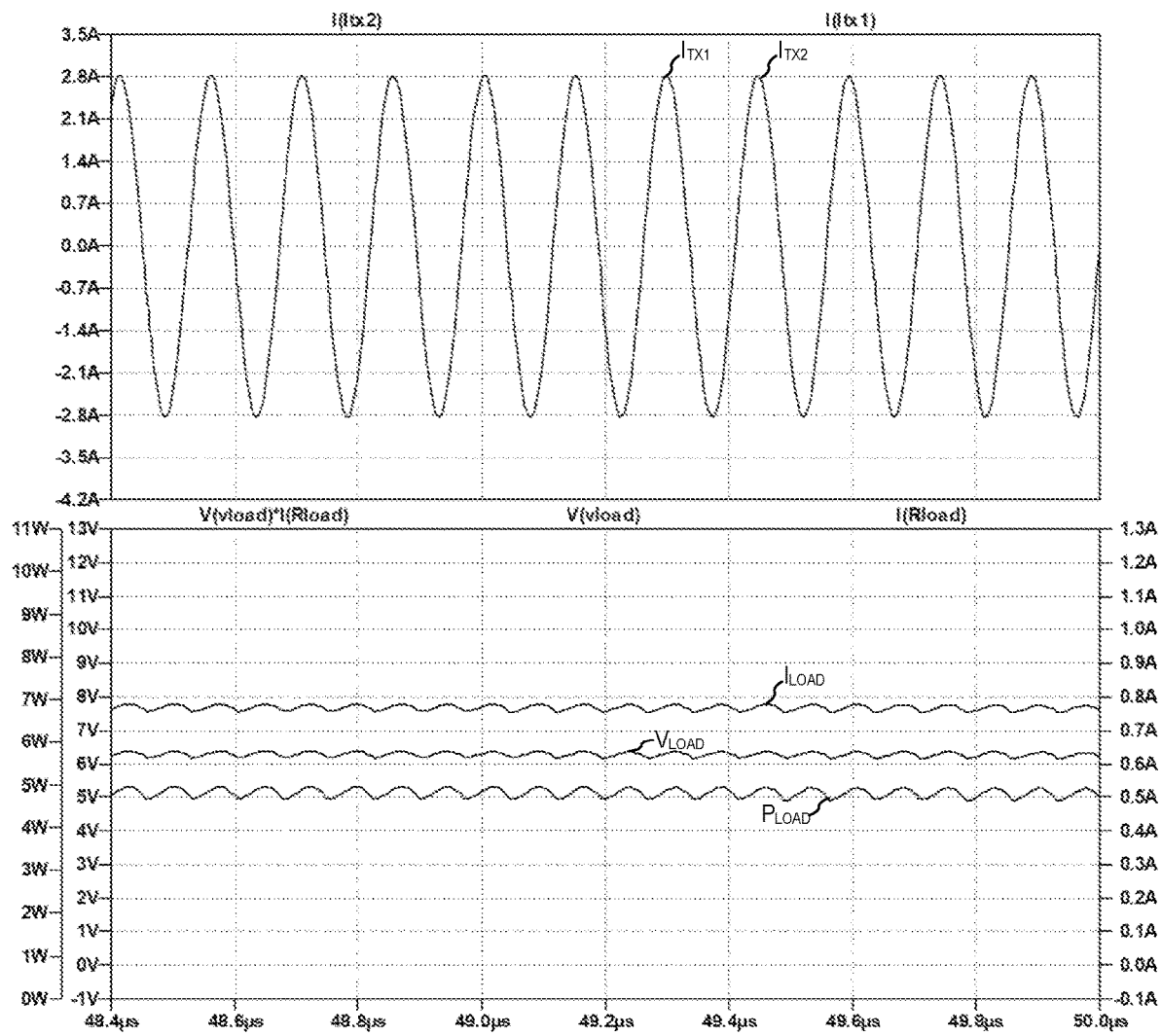
FIGS. 3A-3D show waveforms associated with the wireless charging system of FIG. 2, according to an embodiment of the present invention.

As shown in FIG. 3A, when current $I_{TX1}$ and $I_{TX2}$ have the same magnitude and phase, master TX 202 and slave TX 252 may each transmit the same power to wireless power receiver 204 when the coupling between master TX 202 and wireless power receiver 204 is the same as the coupling between slave TX 252 and wireless power receiver 204.

Figure 3B:
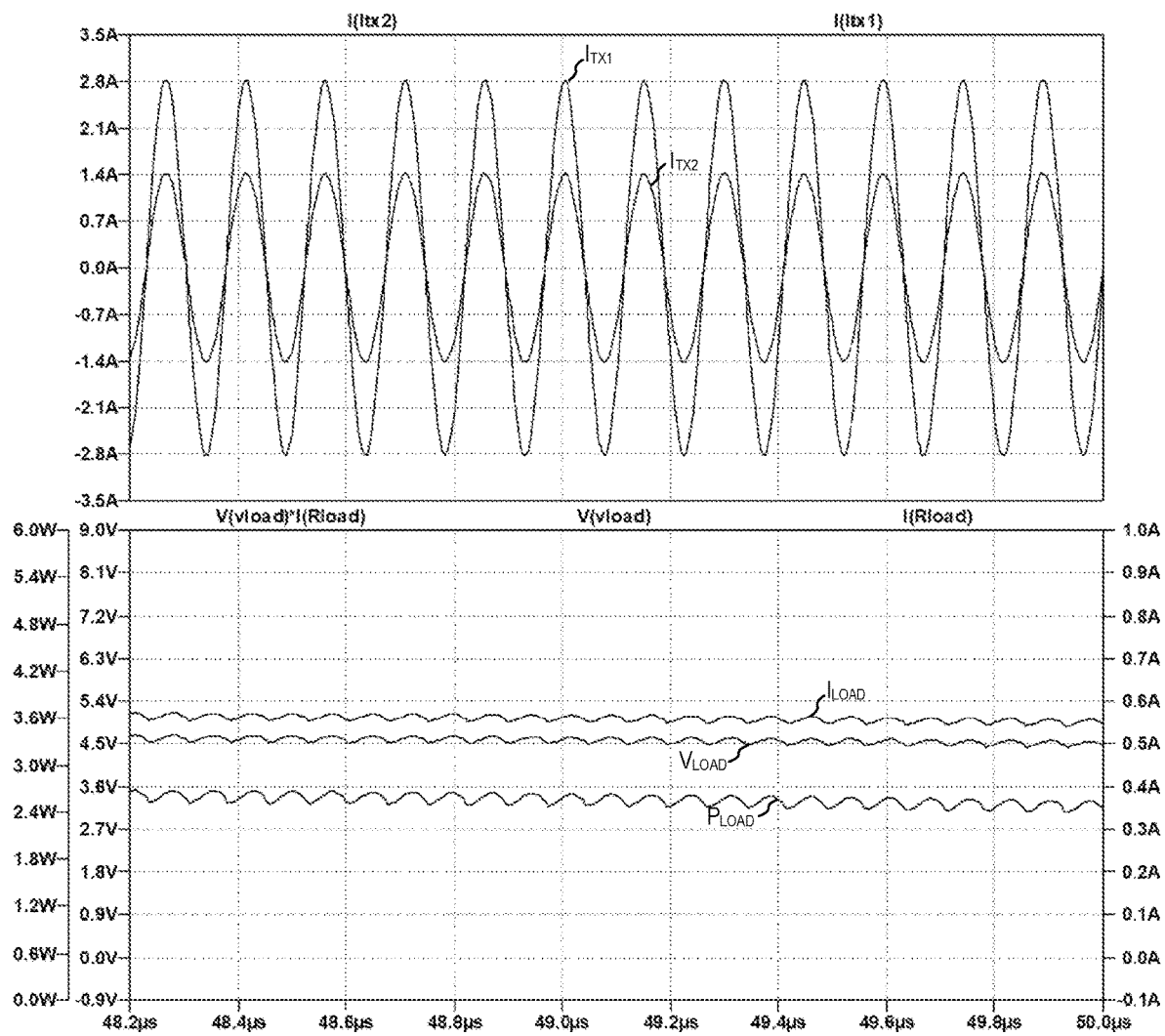

Changing the magnitude of one of the transmitting currents (e.g., $I_{TX2}$) may cause a change in the power wirelessly received by wireless power receiver 204, as shown in FIG. 3B. Such change in power wirelessly received by wireless power receiver 204 may be attributed, in part, to a change in wireless power transmitted by the one (e.g., slave TX 252) or both wireless power transmitter (e.g., mater TX, slave TX 252, or both).

Figure 3C:
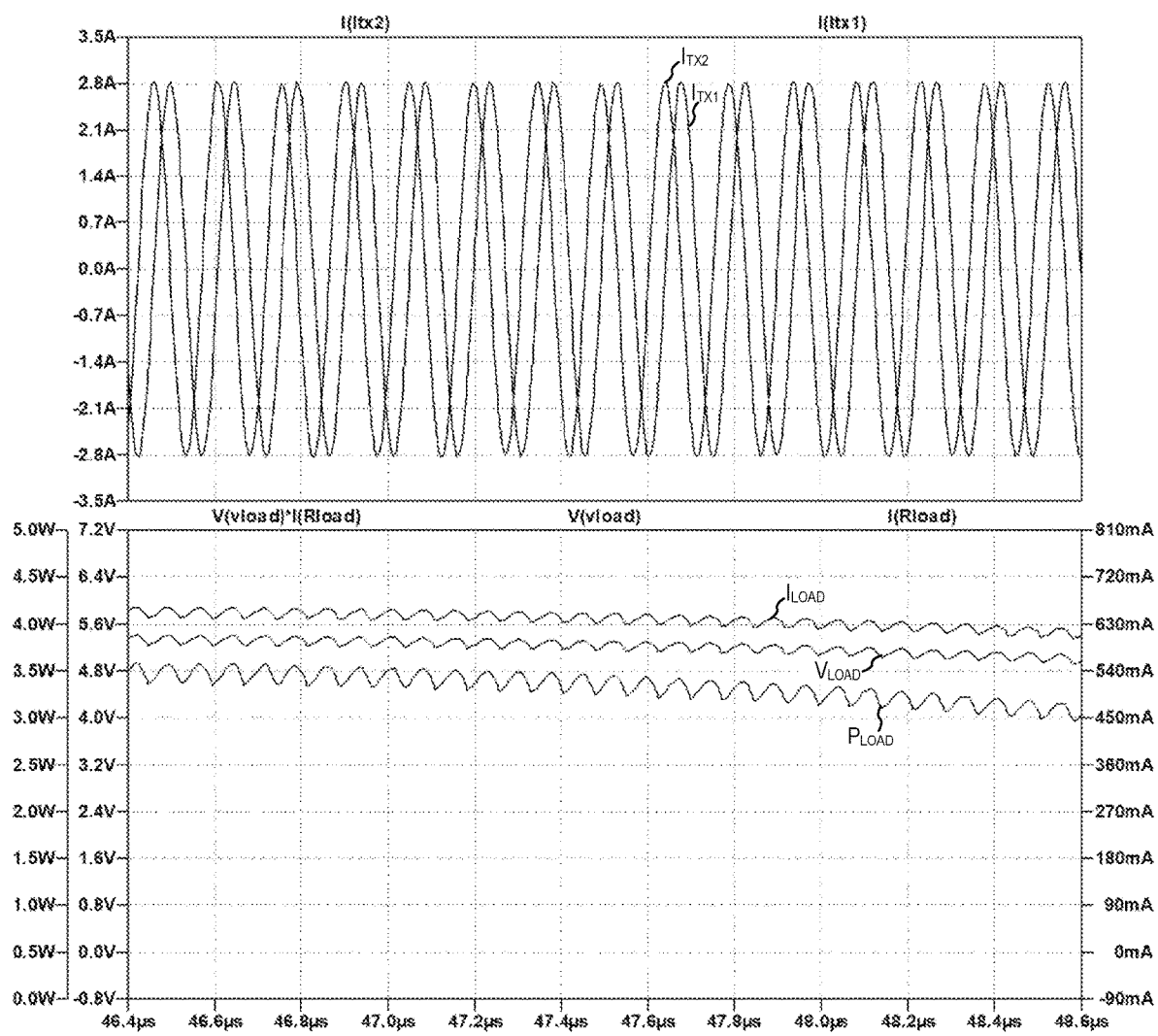

Even without changing the amplitude of currents $I_{TX1}$ and $I_{TX2}$, as the phase difference between $I_{TX1}$ and $I_{TX2}$ changes, the amount of power wirelessly received by wireless power receiver 204 from master TX 202 and slave TX 252 may change, as illustrated by FIG. 3A and FIG. 3C. The change in power wirelessly received by wireless power receiver 204 from master TX 202 and slave TX 252 when the phase between currents $I_{TX1}$ and $I_{TX2}$ changes may be attributed, in part, to a change in impedance caused by the interaction between master TX 202 and wireless power receiver 204, and between slave TX 252 and wireless power receiver 204.

Figure 3D:
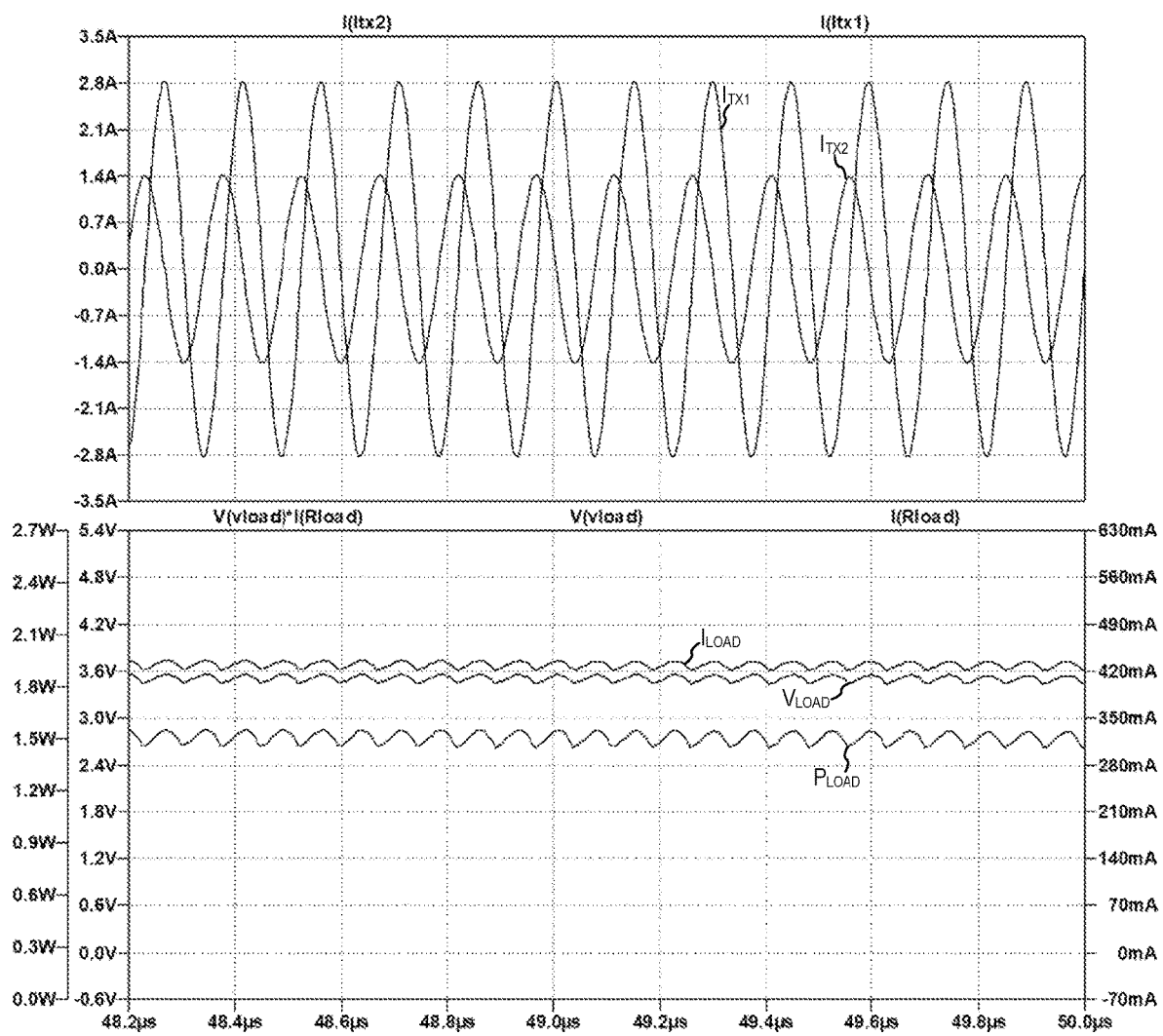

When operating master TX 202 and slave TX 252 with currents $I_{TX1}$ and $I_{TX2}$ with a phase difference different from 0, the magnitude of one of the currents (e.g., the magnitude of current $I_{TX2}$) may affect the impedance seen by the other wireless power transmitter (e.g., master TX 202), may affect the output power of both, the master TX 202 and the slave TX 252, and may result in a change in power wirelessly received by wireless power receiver 204, as shown by FIG. 3D.

When master TX 202 and slave TX 252 are (e.g., magnetically) coupled (e.g., lightly or tightly coupled), the interactions between master TX 202, slave TX 252, and wireless power receiver 204 may affect the impedance seen by master TX 202. For example, when master TX 202 and slave TX 252 are coupled (e.g., lightly or tightly coupled), the phase difference between the transmitting currents $I_{TX1}$ and $I_{TX2}$ may affect the characteristic of the impedance (e.g., more inductive, less inductive, more capacitive, less capacitive) seen by drivers 214 and 264 and the magnitudes of the currents $I_{TX1}$ and $I_{TX2}$ may affect the magnitude of the impedance seen by the drivers 214 and 264.

In an embodiment of the present invention, the phase and/or magnitude of the transmitting current $I_{TX2}$ of the slave TX 252 is controlled (e.g., by controller 230), with respect to the phase and magnitude of current $I_{TX1}$ of the master TX 202, to tune the impedance seen by driver 214, e.g., to shift the resonance frequency of master TX 202 to improve wireless power transmission to wireless power receiver 204.

In some embodiments, master TX 202 and slave TX 252 are not tightly coupled (e.g., with a coupling coefficient below 0.1). For example, in some embodiments, transmitting coil 217 has a radius of 3 in, and transmitting coil 219 is located at the center of transmitting coil 217 and has a radius of less than 1 in so that only a small portion of the field generated by transmitting coil 217 goes through transmitting coil 219. By master TX 202 and slave TX 252 not being tightly coupled, some embodiments advantageously allow for operating drivers 214 and 264 with a less severe interaction between the drivers 214 and 264 and thus resulting in a more controlled interaction.

In some embodiments, tight coupling is avoided by tilting the plane of coil 219 (e.g., by 45°) with respect to the plane of coil 217 to reduce the amount of field crossing through coil 219 from 217.

Figure 4:
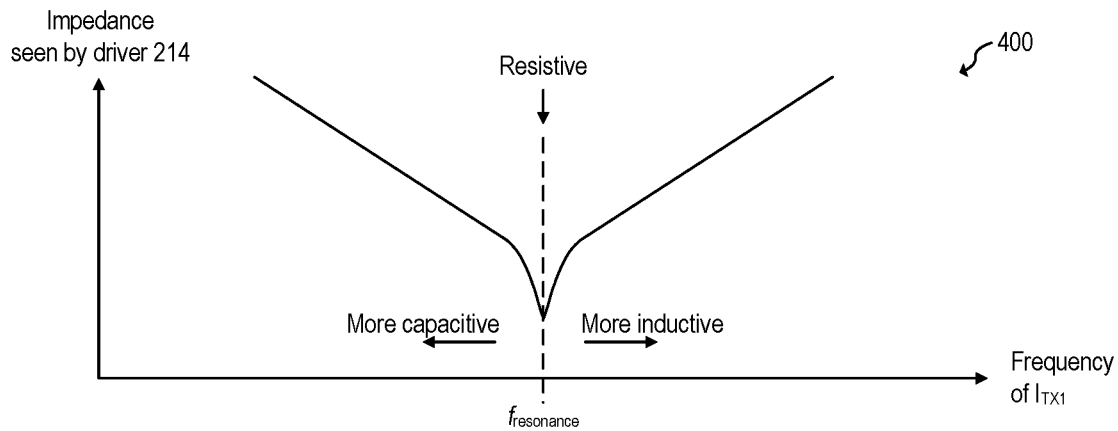
FIG. 4 shows a plot illustrating the impedance the driver of the master TX of FIG. 2 sees as the operating frequency of current the transmitting current of the master TX of FIG. 2 changes with respect to the resonance frequency, according to an embodiment of the present invention.

FIG. 4 shows plot 400 illustrating the impedance the driver 214 sees as the operating frequency of current $I_{TX}$, changes with respect to the resonance frequency $f_{resonance}$. A capacitive impedance seen by master TX 202 causes the voltage $V_{TX1}$ to lag current $I_{TX1}$ (a negative phase). Conversely, an inductive impedance seen by master TX 202 causes the voltage $V_{TX1}$ to lead current $I_{TX1}$ (a positive phase). Thus, some embodiments measure voltage $V_{TX1}$ and current $I_{TX1}$ to determine the impedance seen by driver 214, and adjust the phase and/or magnitude of current $I_{TX2}$ with respect to current $I_{TX1}$ to change the impedance seen by driver 214 in a desired direction.

Figure 5:
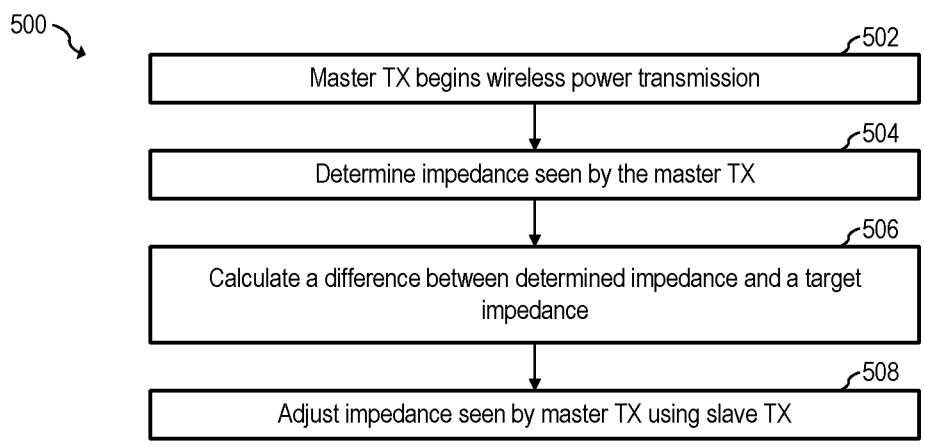
FIG. 5 shows a flow chart of an embodiment method for adjusting the impedance seen by the master TX of FIG. 2 using the slave TX of FIG. 2 during startup, according to an embodiment of the present invention.

FIG. 5 shows a flow chart of embodiment method 500 for adjusting the impedance seen by master TX 202 using slave TX 252 during startup, according to an embodiment of the present invention.

During step 502, master TX 202 begins wireless power transmission to wireless power receiver 204.

During step 504, current $I_{TX1}$ and voltage $V_{TX1}$ are measured and the impedance seen by master TX 202 is determined (e.g., by controller 230) based on the measured current $I_{TX1}$ and voltage $V_{TX1}$. In some embodiments, the current $I_{TX1}$ and/or voltage $V_{TX1}$ may be measured during step 504 without calculating the impedance seen by the master TX 202.

During step 506, the difference between the determined impedance (e.g., during step 504) and a target impedance is determined. In some embodiments, the target impedance corresponds to an optimal impedance for driver 214 to operate. In some embodiments, the target impedance may be determined, e.g., using a look-up table. In some embodiments, step 506 may be omitted.

During step 508, the impedance seen by the master TX 202 (the phase angle between $V_{TX1}$ and $I_{TX1}$) is adjusted by controlling slave TX 252. For example, in some embodiments, slave TX 252 may keep the peak magnitude of $I_{TX2}$ constant (e.g., by keeping constant the DC supply voltage $V_{CC2}$ supplied to driver 264) and may modify the switching times of driver 264 (e.g., may sweep a predetermined phase range) to modify the phase difference between currents $I_{TX1}$ and $I_{TX2}$ in a first direction to increase the impedance seen by master TX 202, and may modify the phase difference between currents $I_{TX1}$ and $I_{TX2}$ in a second direction to decrease the impedance seen by master TX 202. For example, in some embodiments, $V_{cc1}$ and $V_{cc2}$ may be equal (e.g., supplied by the same buck or boost converter).

In some embodiments, slave TX 252 may keep a non-zero phase difference between currents $I_{TX1}$ and $I_{TX2}$ constant and may change (e.g., increase or decrease, such as sweeping a predetermined voltage range)) the peak magnitude of $I_{TX2}$ (e.g., by increasing or decreasing the DC supply voltage $V_{CC2}$ supplied to driver 264) to increase or decrease the impedance seen by master TX 202. For example, in some embodiment, once the $V_{cc2}$ level is determined during step 508, the same ratio between $V_{cc1}$ and $V_{cc2}$ is kept while slowly increasing the power level after step 508 (during startup).

In some embodiments, slave TX 252 may modify the DC voltage $V_{CC2}$ supplied to driver 264 (which may affect the magnitude of voltage $V_{TX2}$) and the phase difference between $I_{TX1}$ and $I_{TX2}$ to cause a change in impedance seen by master TX 202.

In some embodiments, slave TX 252 changes the phase and/or DC power supply ($V_{cc2}$) of driver 264 slowly (e.g., in small steps) until reaching the target impedance (e.g., while checking after each step if the target impedance was achieved). In some embodiments, slave TX 252 changes the phase and/or DC power supply ($V_{cc2}$) of driver 264 in a single step to arrive at the target impedance.

In some embodiments, the changes slave TX 252 performs during step 508 are performed to arrive at a target current $I_{TX}$ instead of to arrive at a target impedance. In some embodiments, the changes slave TX 252 performs during step 508 are performed to keep the supply voltage $V_{cc1}$ at a predetermined range while causing wireless power receiver 204 to receive a target amount of power $P_{LOAD}$.

In some embodiments, master TX 202 begins wireless power transmission during step 502 with an initial, low level of wireless power, and then, after performing step 508, increases the power level (e.g., slowly) until arriving at a target power level (e.g., as determined during power negotiation between receiver 204 and transmitter 201). By having an initial, low level of wireless power transfer, some embodiments may advantageously prevent causing damage to wireless power receiver 204 (e.g., due to an overvoltage of $V_{RX}$), e.g., in the event that the coupling between the coil $L_{TX}$ and coil $L_{RX}$ is higher than expected (e.g., when the wireless power receiver 204 is closer than expected).

In some embodiments, during or after startup, wireless power receiver 204 communicates with master TX 202 via in-band communication by using resistive load modulation (e.g., by connecting and disconnecting a resistance to no $V_{LOAD}$ and encoding data at a frequency of, e.g., between 1 kHz and 2 kHz). By using resistive load modulation, some embodiments advantageously are capable to communicate in-band without changing the reactance seen by master TX 202. Other communication methods are also possible. For example, some embodiments may use Bluetooth to communicate from wireless power receiver 204 to master TX 202.

Figure 6:
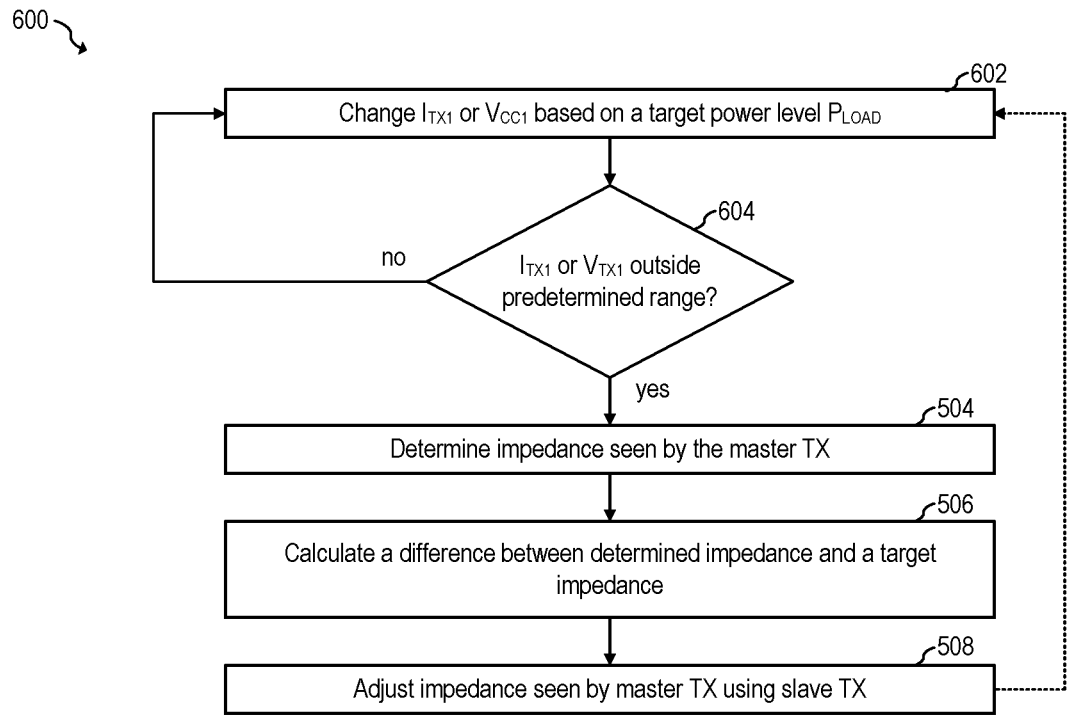
FIG. 6 shows a flow chart of an embodiment method for adjusting the impedance seen by the master TX of FIG. 2 using the slave TX of FIG. 2 during active wireless power transfer, according to an embodiment of the present invention.

FIG. 6 shows a flow chart of embodiment method 600 for adjusting the impedance seen by master TX 202 using slave TX 252 during active wireless power transfer, according to an embodiment of the present invention.

As shown in FIG. 6, during active wireless power transfer (e.g., at a target power level) steps 504, 506, and 508 may be performed to adjust the impedance seen by master TX 202 when a condition is met. For example, during step 602, master TX 202 may regulate the amount of power transmitted to wireless power receiver 204 by changing the magnitude of $I_{TX1}$ (e.g., by varying duty cycle and/or by changing $V_{CC1}$).

In some embodiments, method 600 may be used to keep current $I_{TX1}$ and/or within a predetermined range (where the predetermined range may be dynamically changed, e.g., based on $P_{LOAD}$). For example, in some embodiments, when a change in $I_{TX1}$ or $V_{TX1}$ to maintain a desired $P_{LOAD}$ (during step 602) would cause the $I_{TX1}$ and/or $V_{TX1}$ to be outside their respective predetermined ranges, the impedance seen by master TX 202 may be adjusted by performing steps 504, 506, and 508 to cause $I_{TX}$ and/or $V_{TX1}$ to remain in their respective predetermined ranges while transmitting a desired power $P_{LOAD}$.

In some embodiments, during active wireless power transfer (e.g., at a target power level) steps 504, 506, and 508 may be performed periodically (instead of, or in addition to, performing method 600).

Figure 7:
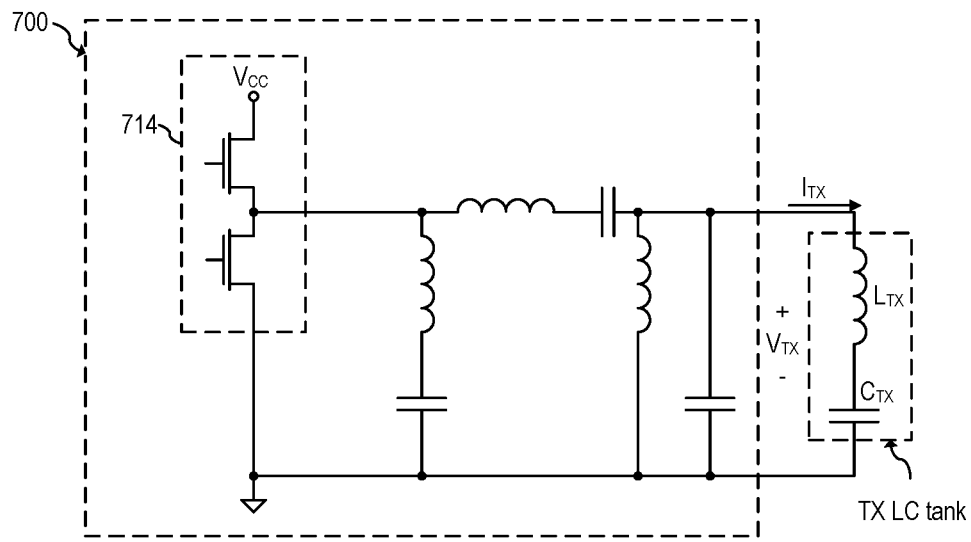
FIG. 7 shows a schematic diagram of a driver, according to an embodiment of the present invention.

FIG. 7 shows a schematic diagram of driver 700, according to an embodiment of the present invention. TX drivers 214 and/or 264 may be implemented as TX driver 700.

As shown in FIG. 7, driver 700 includes half-bride 714 and may be implemented as a class-D push-pull driver. In some embodiments, half-bridge 714 may be replaced with a full-bridge.

Figure 8:
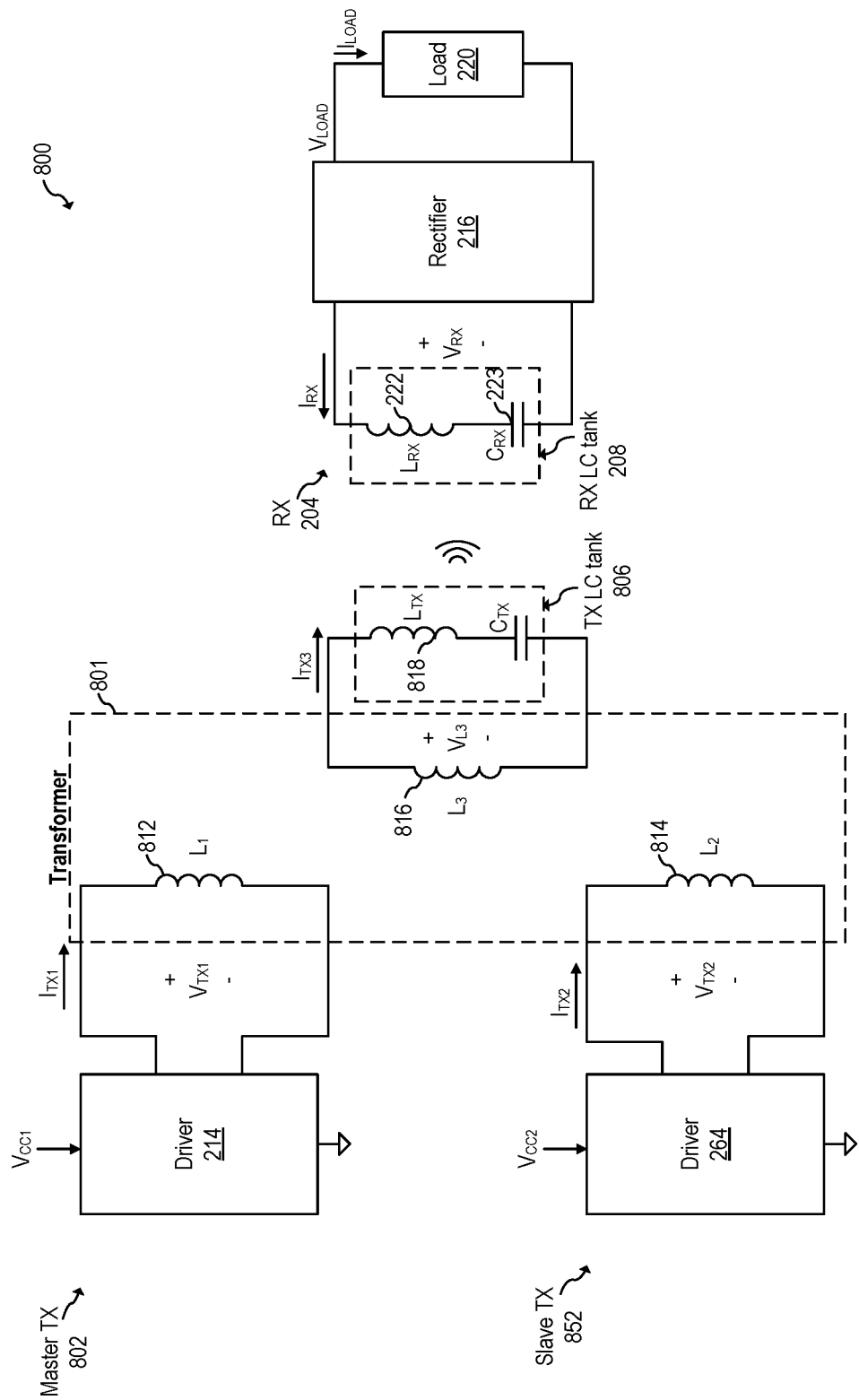
FIG. 8 shows a schematic diagram of a wireless power transfer system, according to an embodiment of the present invention.

In some embodiments, master TX 202 and slave 252 may be tightly coupled while performing methods 500 or 600. For example, FIG. 8 shows a schematic diagram of wireless power transfer system 800, according to an embodiment of the present invention. Wireless power transfer system 800 includes master wireless power transmitter 802, slave wireless power transmitter 852, transformer 801 coupled to LC tank 806, and wireless power receiver 204.

Wireless power transfer system 800 operates in a similar manner as wireless power transfer system 200. Wireless power transfer system 800, however, includes transformer 801.

Although not shown in FIG. 8, and similar to wireless power transfer system 200, wireless power transmitters 802 and 852 may be implemented as part of a wireless power transmitter device (e.g., implemented in a PCB) that also includes a controller (e.g., 230) and converters (e.g., 232 and 234) for supplying voltages $V_{CC1}$ and $V_{CC2}$ to drivers 214 and 264, respectively.

As shown in FIG. 8, transformer 801 comprises 3 windings (812, 814, and 816). In some embodiments, current $I_{TX3}$ is the superposition of the currents induced by currents $I_{TX1}$ and $I_{TX2}$. Thus, the voltage $V_{L3}$ may be the result of the voltages induced by currents $I_{TX1}$ and $I_{TX2}$, which may have a phase difference and different amplitudes. Changing the amplitude and phase difference between currents $I_{TX1}$ and $I_{TX2}$ with respect to the induced voltage $V_{L3}$ results in a change in impedance seen be winding $L_3$, thus, changing the impedance seen by drivers 214 and/or 264, which may result in a change in power transferred to receiving coil $L_{RX}$.

In some embodiments, using a physical transformer for coupling coils 812 and 814 with coil 816 may advantageously result in better EMI performance.

Figure 9:
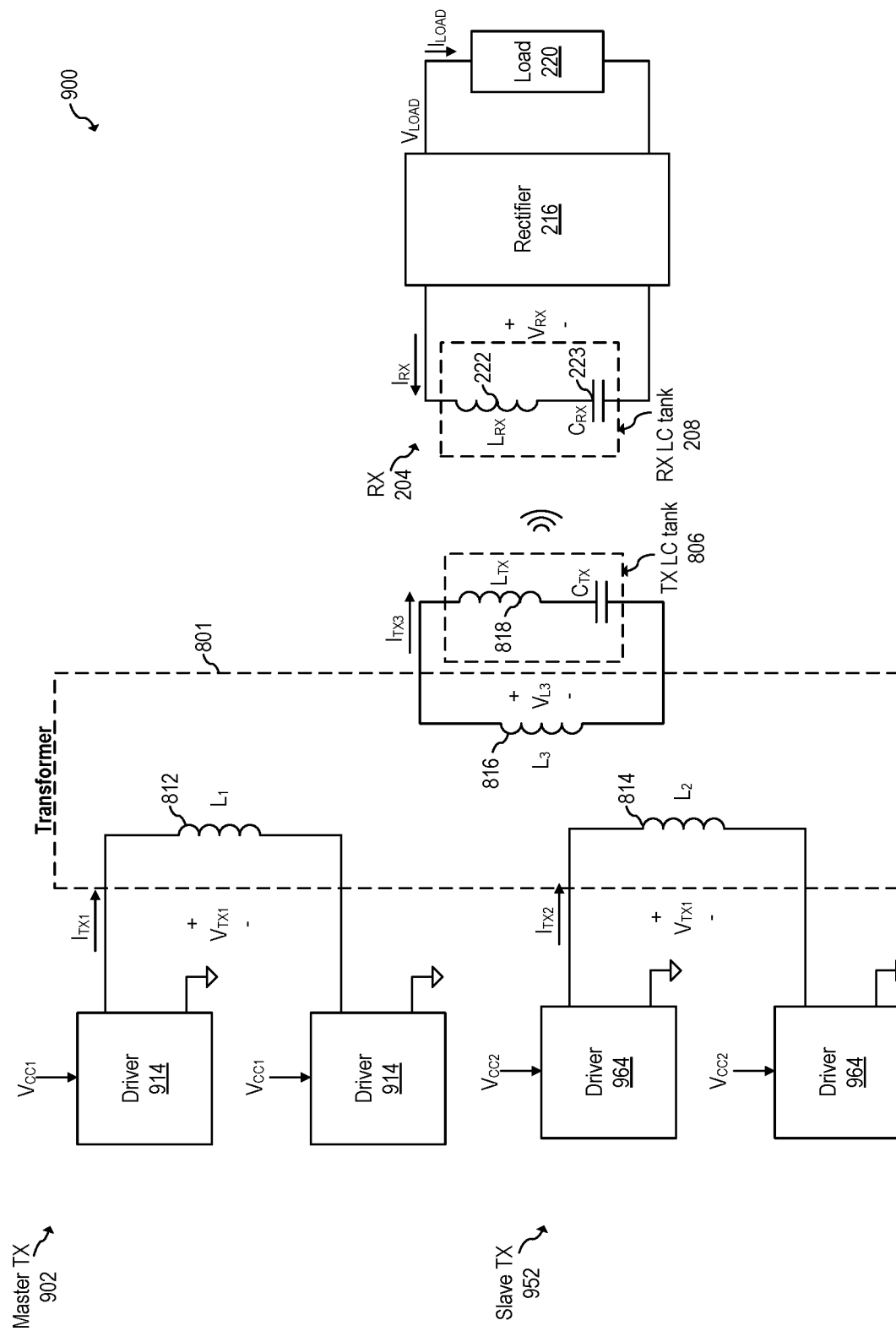
FIG. 9 shows a schematic diagram of a wireless power transfer system, according to an embodiment of the present invention.

In some embodiments, the master TX (e.g., 202, 802) and the slave TX (e.g., 252, 852) may be implemented with differential drivers. For example, FIG. 9 shows a schematic diagram of wireless power transfer system 900, according to an embodiment of the present invention. Wireless power transfer system 900 includes master TX 902, slave TX 952, transformer 801 with coil 816 coupled to LC tank 806, and wireless power receiver 204.

Wireless power transfer system 900 operates in a similar manner as wireless power transfer system 800. In wireless power transfer system 900, however, master TX 902 is implemented differentially using two drivers 914, and slave TX 952 is implemented differentially using two drivers 964. System 900 may implement methods 500 and 600.

Figure 10:
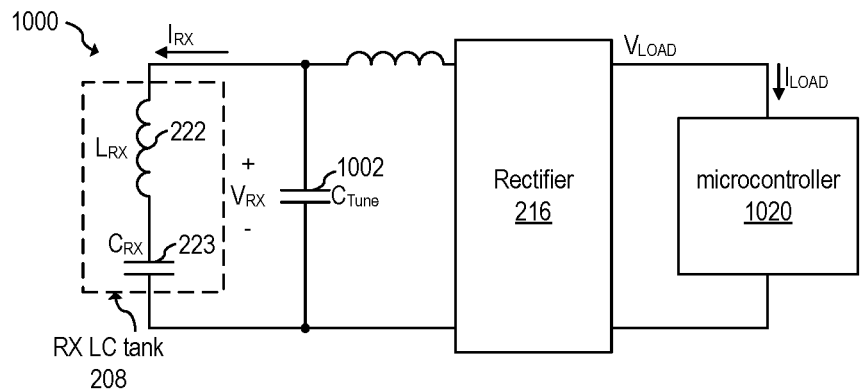
FIGS. 10-12 show schematic diagrams of wireless power receivers, according to embodiments of the present invention.

FIG. 10 shows a schematic diagram of wireless power receiver 1000, according to an embodiment of the present invention. Wireless power receiver 204 may be implemented as wireless power receiver 1000. As shown in FIG. 10, wireless power receiver 1000 includes capacitor 1002, which may be implemented with a bank of capacitors, or with a variable capacitor, and where capacitance $C_{tune}$ may be controlled by controller 1020, e.g., to modify the resonance frequency of the LC tank 208 so that it matches the operating frequency of current $I_{TX1}$.

In some embodiments in which rectifier 216 is implemented with a synchronous rectifier, microcontroller 1020 may control the switching of the synchronous rectifier.

Figure 11:
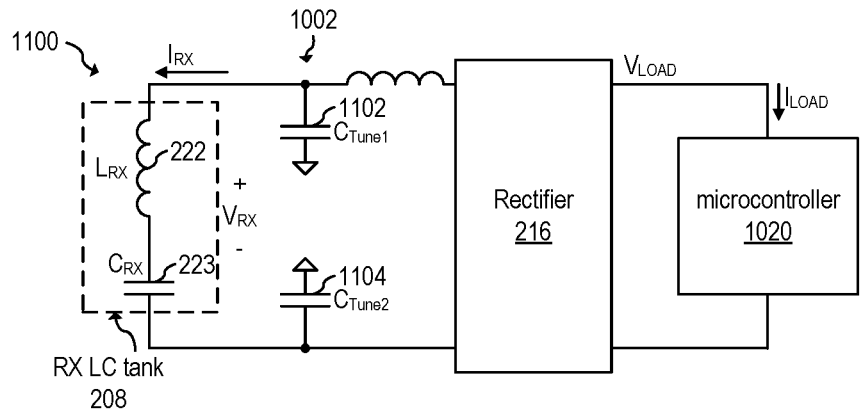

In some embodiments, capacitor 1002 may be implemented as two bank of capacitors, or two variable capacitors. For example, FIG. 11 shows a schematic diagram of wireless power receiver 1100, according to an embodiment of the present invention. Wireless power receiver 204 may be implemented as wireless power receiver 1100.

As shown in FIG. 11, wireless power receiver 1100 includes capacitor 1002 implemented as two bank of capacitors 1102 and 1104.

In some embodiments, capacitor 1002 may be configured with a default value for capacitance $C_{tune}$ using fuses. Using fuses advantageously allow for capacitor 1002 to exhibit its default value even when power is not being received by RX LC tank 208. By having capacitor 1002 with a default value that approximates the resonance frequency of LC tank 208 to the operating frequency of $I_{TX1}$ (e.g., 6.78 MHz), some embodiments advantageously allow for receiving enough power with RX LC tank 208 during startup to power-up micro-controller 1020. In some embodiments, once microcontroller 1020 is powered-up, the microcontroller 1020 may optimize performance of wireless power receiver (e.g., 204, 1000, 1100), e.g., to modify further capacitance $C_{tune}$ to get closer to the resonance frequency of current $I_{TX}$.

In some embodiments, the default value of the capacitance $C_{tune}$ is determined during testing of the wireless power receiver (e.g., 204, 1000, 1100). For example, in some embodiments, a tester burns fuses (e.g., disposed in a PCB of the wireless power receiver) to cause the resonance frequency of RX LC tank 208 to be as close as possible to 6.78 MHz.

Figure 12:
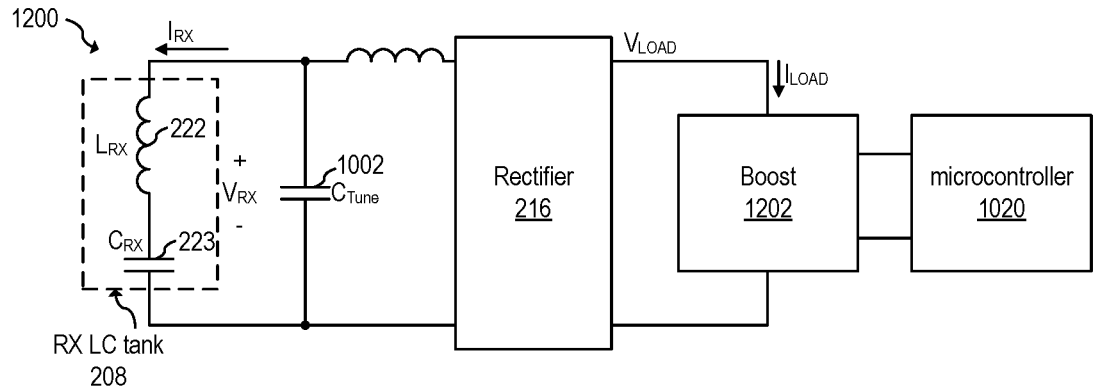

In some embodiments, during startup, wireless power receiver 204 may not receive a voltage $V_{RX}$ that is high enough to power up microcontroller 1020. In some embodiments, a boost converter, such as a switched-mode power supply boost or buck-boost converter, may be used to power microcontroller 1020 during startup. For example, FIG. 12 shows a schematic diagram of wireless power receiver 1200, according to an embodiment of the present invention. Wireless power receiver 204 may be implemented as wireless power receiver 1200.

Wireless power receiver 1200 operates in a similar manner as wireless power receiver 1000. Wireless power receiver, however, includes boost converter 1202 for powering controller 1020. In some embodiments, boost converter 1202 may be used, e.g., additionally, to power additional loads, such as a battery charger, for example. In some embodiments, boost converter 1202 is turned off (e.g., and configured in bypass mode so that voltage $V_{LOAD}$ is delivered to controller 1020) after startup.

In some embodiments, during startup, the wireless power transmitter (e.g., 202, 802, 902) may scan to detect the resonance frequency of the wireless power receiver (e.g., 204, 1000, 1100, 1200). For example, in some embodiments, the wireless power transmitter sweeps the switching frequency of current $I_{TX1}$ until a packet is received from the wireless power receiver (e.g., via in-band communication), which may be indicative that the wireless power receiver received enough power to operate to send the packet. After detecting the resonance frequency of the wireless power receiver, the wireless power transmitter may operate at the resonance frequency of the wireless power receiver during startup, and return to the default operating frequency (e.g., 6.78 MHz) after startup. In some embodiments, the wireless power transmitter returns slowly from the resonance frequency to the default operating frequency to allow for the wireless power receiver to track the operating frequency of the wireless power transmitter. By operating at the resonance frequency of the wireless power receiver during startup, some embodiments advantageously allow for microcontroller 1020 to receive enough voltage to power-up and adjust capacitance $C_{tune}$ to optimize wireless power transfer.

Advantages of some embodiments include the capability of operating a wireless power transfer system with a small distance between the transmitting coil and the receiving coil as well as with a long distance between the transmitting coil and the receiving coil. For example, by tuning the impedance seen by the master TX (e.g., 202, 802, 902) using the slave TX (e.g., 252, 852, 952) some embodiments are advantageously capable of transferring power wirelessly over relatively long distances (e.g., across a think wall such as 6 inches thick) to power a wireless power receiver (e.g., a doorbell in an exterior portion of an exterior wall of a house from the interior portion of the exterior wall of the house). In some embodiments, the same circuit used to wirelessly transfer power over relatively long distance may be tuned (e.g., using the slave TX) to operate at small distance (e.g., 1 mm) between the transmitting coil and the receiving coil without damaging the wireless power receiver.

Figure 13A:
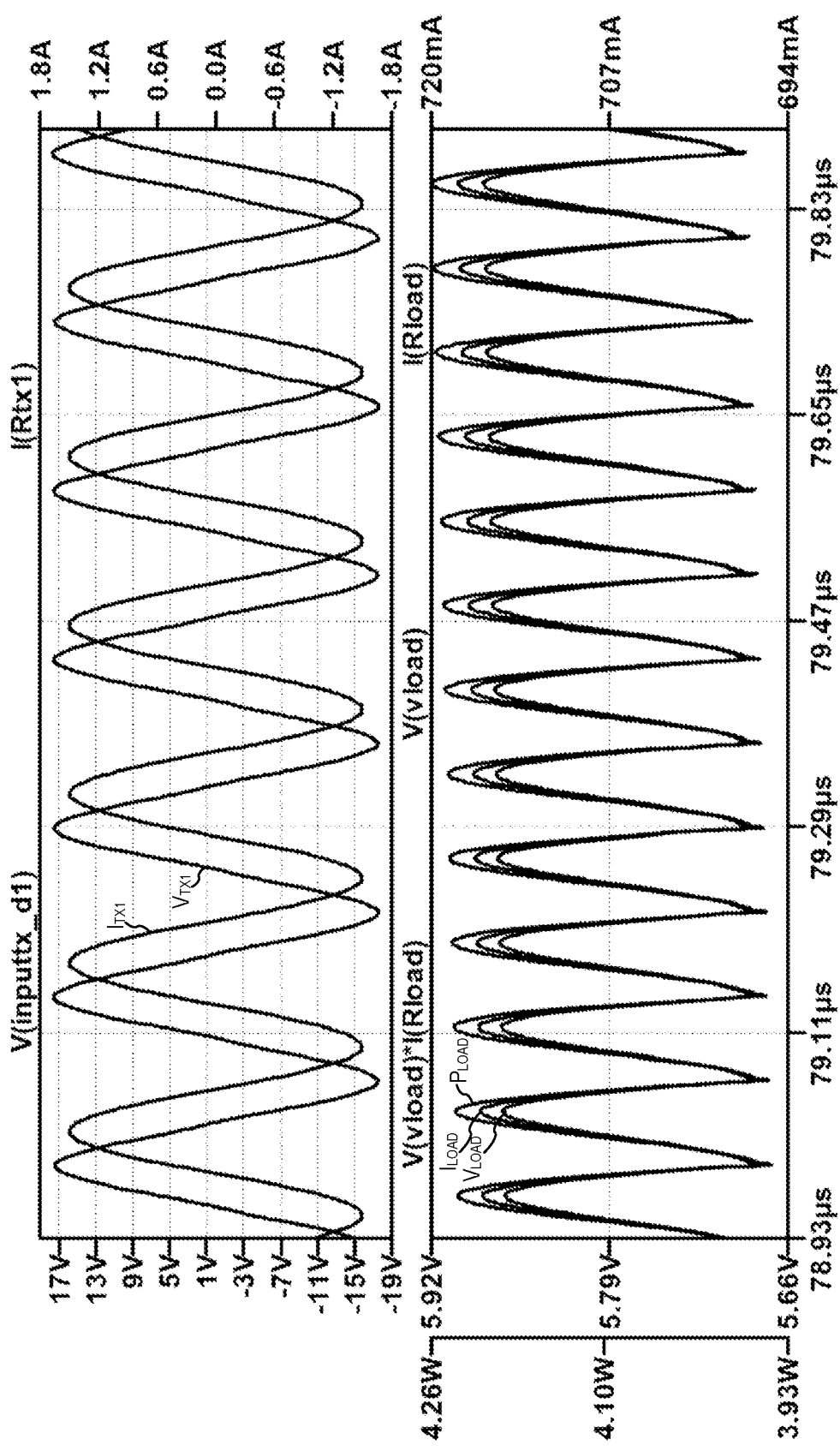
FIGS. 13A and 13B show the effect that different impedances seen by a master TX have in wireless power received by a wireless power receiver, according to an embodiment of the present invention.
Figure 13B:
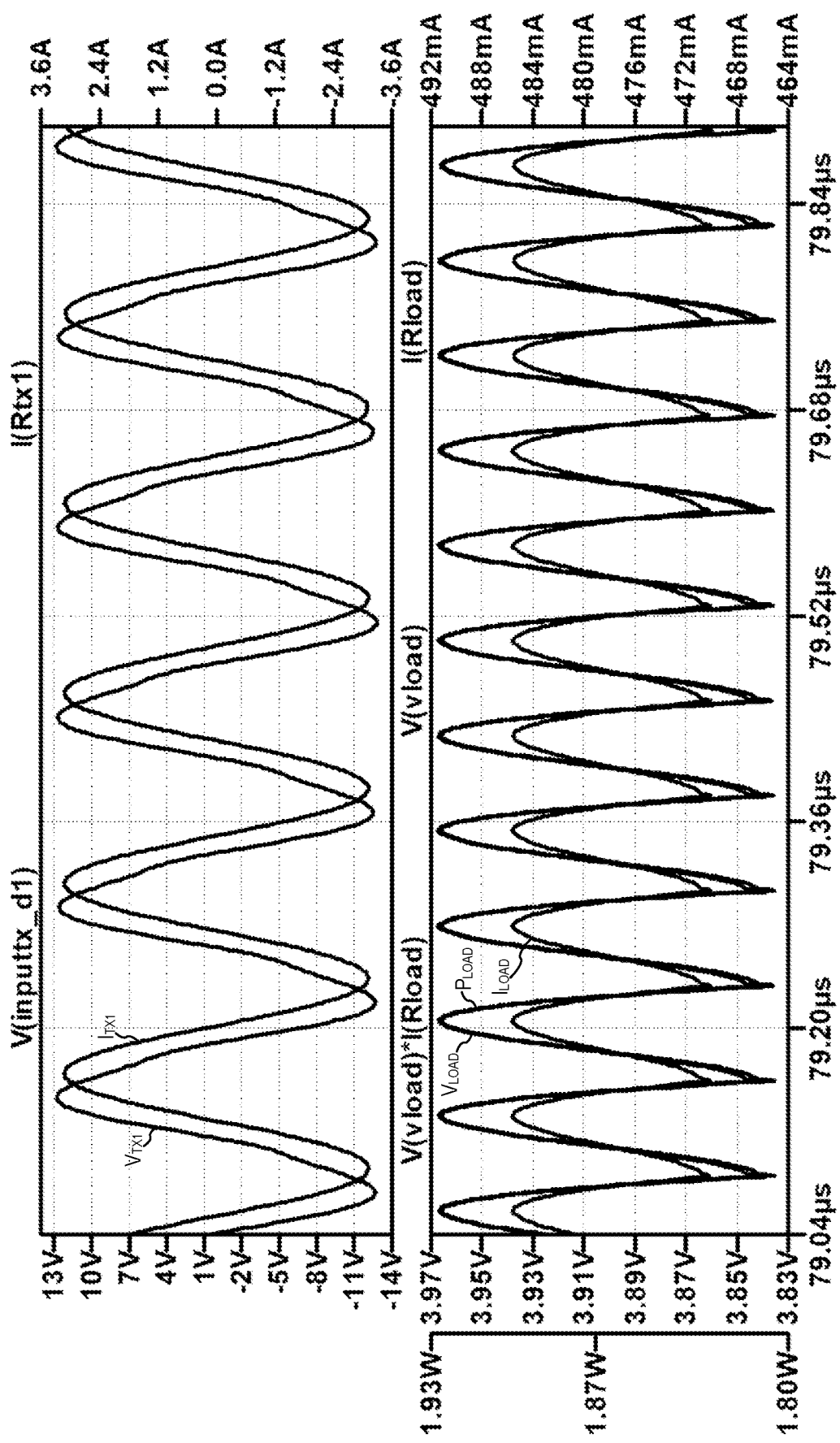

FIGS. 13A and 13B show the effect that different impedances seen by master TX 202 have in wireless power received by wireless power receiver 204, according to an embodiment of the present invention. As shown in FIGS. 13A and 13B, the phase angle between the voltage $V_{TX1}$ and current $I_{TX1}$ shown in FIG. 13A is different from the phase angle between the voltage $V_{TX1}$ and current $I_{TX1}$ shown in FIG. 13B. As also shown in FIGS. 13A and 13B, the power $P_{LOAD}$ received by wireless power receiver 204 is also different. In some embodiments, controller 230 causes the changes in phase angle between voltage $V_{TX1}$ and current $I_{TX1}$ by controlling slave TX 252, and also causes a change in the magnitude of voltage $V_{TX1}$ and current $I_{TX1}$ by, e.g., directly controlling driver 214, as well as by controlling slave TX 252.

In some embodiments (e.g., as shown in FIGS. 8 and 9), a (e.g., physical) transformer 801 may be used to act as a repeater to transfer power wirelessly from the master TX (802, 902) to the wireless power receiver (e.g., 204, 1000, 1100, 1200). In some embodiments, an air transformer (also referred to as air core transformer), or a transformer relying on dielectric(s) other than air, may be used instead of a physical transformer to transfer power wirelessly from the master TX to the wireless power receiver. For example, with respect to FIG. 8, an air transformer may be modeled with coils 816 and 818 being part of a single coil (e.g., with a single turn), where coils 812 and 814 are (e.g., lightly) coupled (e.g., with a coupling coefficient below 0.1) with portion 816 of the single coil, where portion 816 represents the mutual inductance between the single coil and coils 812 and 814, and where the single coil ($L_3+L_{TX}$) transmits power to coil 222.

In some embodiments, using an air/dielectric transformer for transferring power from coils 812 and 814 to coil 222 may advantageously result in a lower implementation cost, higher quality factor Q (which may result in a better resonance system), and higher power transfer efficiency when compared with using a physical transformer.

Figure 14:
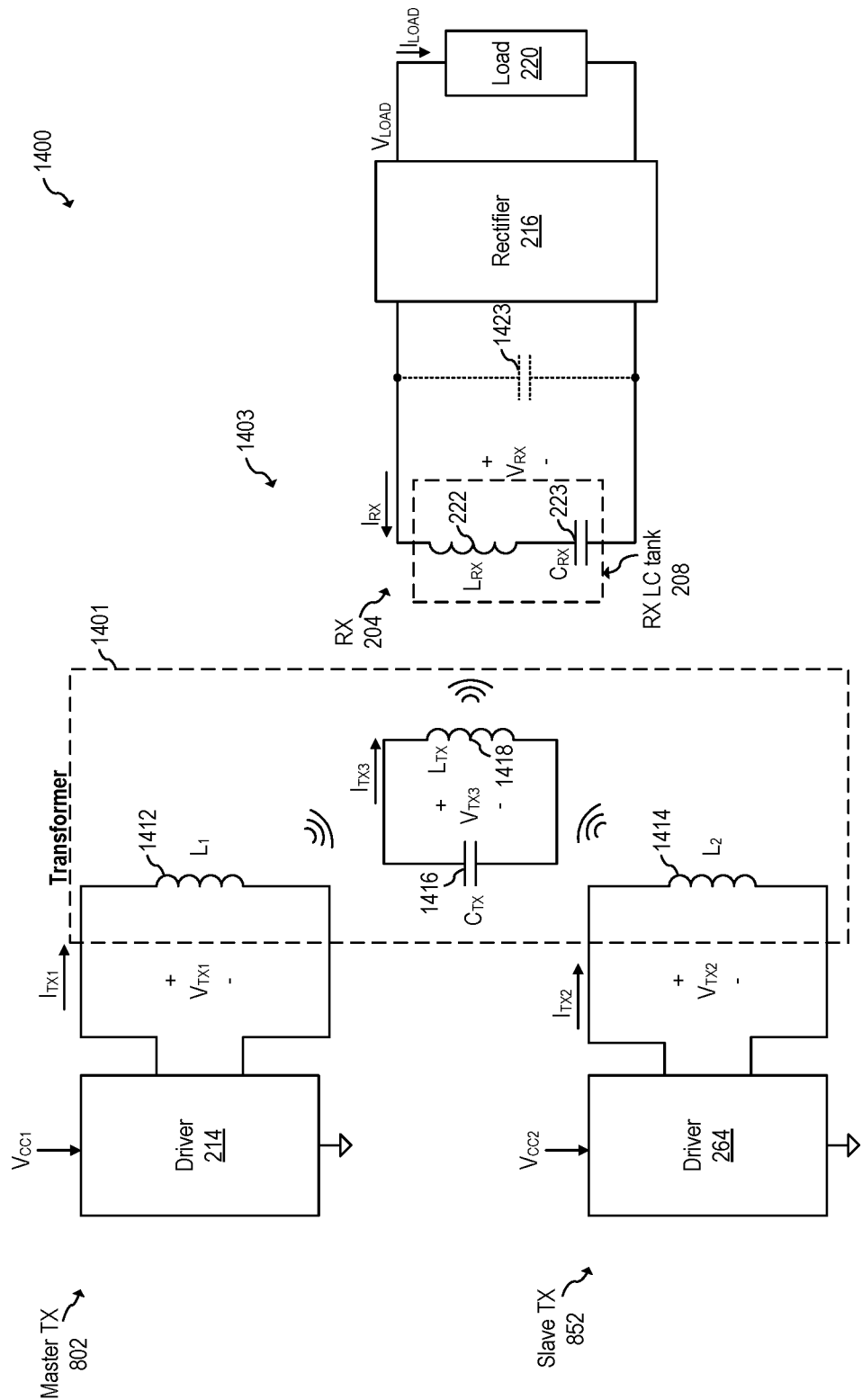
FIG. 14 shows a schematic diagram of a wireless power transfer system using and air transformer, according to an embodiment of the present invention.

FIG. 14 shows a schematic diagram of wireless power transfer system 1400 using air transformer 1401, according to an embodiment of the present invention. Wireless power transfer system 1400 includes master wireless power transmitter 802, slave wireless power transmitter 852, air/dielectric transformer 1401, and wireless power receiver 204. In some embodiments, wireless power transfer system 1400 operates in a similar manner as wireless power transfer system 800, may be implemented with differential drivers (e.g., as shown in FIG. 9) and may implement methods 500 and 600. Wireless power transfer system 1400, however, transfer power from coils 1412 and 1414 to coil 1418 (also referred to as repeater coil 1418) through air (or other dielectric) and without using a physical transformer.

During active wireless power transmission, currents $I_{TX1}$ and $I_{TX2}$ flowing through coils 1412 and 1414, respectively, (e.g., magnetically) induce (via coil 1418) a current $I_{TX3}$ flowing through coil 1418, where current $I_{TX3}$ may be a superposition of the contributions from currents $I_{TX1}$ and $I_{TX2}$. The flow of current $I_{TX3}$ through coil 1418 induces current $I_{RX}$ flowing through coil 222, which causes voltage $V_{RX}$ to develop across LC resonant tank 208.

In some embodiments, the coupling between coils 1412 and 222 is very small and the coupling between coils 1414 and 222 is very small (e.g., due to the relatively small size of coils 1412 and 1414 and the relatively long distance between coils 1412 and 1414, and coil 222). Therefore, in some embodiments, coils 1412 and 1414 transmit little or no power directly to coil 222, and, instead, transmits power to repeater coil 1418, which then transmits power to coil 222.

In some embodiments, the resonant system 1403, which includes coils 1412, 1414, 1418 and 222, operates with better performance (e.g., higher power transfer capabilities) when coil 1418, which is the element with highest quality factor Q of the resonant system 1403, is free to resonate. The ability of coil 1418 to resonate may advantageously allow for the buildup of relatively high current (and energy) in coil 1418, which may advantageously cause a relatively high voltage $V_{RX}$. Thus, some embodiments avoid having coil 1418 tightly coupled to any of coils 1412, 1414 or 222 to avoid removing too much energy from coil 1418. For example, in some embodiments, master TX may transfer 15 W of power to coil 1418, coil 1418 may transfer 15 W of power to coil 222, and the energy circulating through coil 1418 may be capable of transferring much higher power (e.g., 200 W), e.g., if coupling between coil 1418 and 222 is increased.

In some embodiments, capacitor 1423 is used to operate as a voltage divider with capacitor 223 to reduce the amount of energy removed by rectifier 216 from LC tank 208, thereby advantageously increasing the capability of coil 1418 to resonate freely and accumulate energy. As a result, some embodiments are capable of operating with a small inductance $L_{TX}$ of coil 918, which may advantageously allow for coil 1418 to be implemented with a single turn, which may advantageously result in higher quality factor Q (since a lower inductance may result in lower proximity effects with other coils).

In some embodiments, coils 1412 and 1414 are small relative to coil 1418, which advantageously reduces the coupling between coils 1412 and 1414 with coil 1418, thereby advantageously increasing the capability of coil 1418 to resonate freely and accumulate energy.

In some embodiments, using small TX coils 1412 and 1414 advantageously results in smaller losses at coils 1412 and 1414, thereby advantageously causing an increase in wireless power transmission efficiency.

In some embodiments, wireless power transfer system 1400 may implement methods 500 and/or 600 to adjust/tune the impedance seen by master TX 802 using slave TX 852, e.g., by placing coil 1414 relatively near coil 1412 so that coils 1412 and 1414 are at least lightly coupled. In some embodiments, coils 1412 and 1414 may be placed apart so that there is little to no coupling between coils 1412 and 1414, and wireless power transfer system 1400 may implement methods 500 and/or 600 to adjust/tune the impedance of coil 1418 (e.g., during step 508) using slave TX 852 (e.g., by measuring the impedance of coil 1418 during step 504 instead of the impedance seen by the master TX).

In some embodiments, the impedance of coil 1418 may be measured/determined by measuring a voltage drop across a portion of a turn of coil 1418, which may be indicative of the current $I_{TX3}$ (e.g., by using a known/estimated inductance of the portion of coil 1418 across which the voltage drop is measured).

In some embodiments, coil 1418 may be floating (not grounded). In some embodiments, coil 1418 may be grounded (e.g., at one location/terminal), where such ground may serve as reference for performing a voltage measurement across a portion of coil 1418.

In some embodiments, additional resonant capacitors (not shown) may be coupled in series with coils 1412 and 1414, respectively (e.g., in a similar manner as resonant tanks 206 and 256).

In some embodiments, capacitor 1416 may be implemented with a discrete capacitor. In some embodiments, capacitor 1416 may be implemented without using a discrete capacitor. For example, in some embodiments, capacitor 1416 may be implemented with overlapping metal (e.g., overlapping PCB traces) of coil 1418, such that coil 1418 is a self-resonating coil.

In some embodiments, coils 1412 and 1414 may be magnetically coupled to coil 1418 e.g., by having winding(s) with overlapping areas, and coil 1418 may be magnetically coupled to coil 222, e.g., by having winding(s) with overlapping area. In some embodiments, drivers 214 and/or 254 may drive a capacitive element (instead of a coil) to transfer energy to coil 1418. For example, in some embodiments, driver 214 may drive a capacitor implemented with plates that are capacitively coupled with a portion of coil 918 to induce current $I_{TX3}$.

FIGS. 15A-15D illustrate a possible physical implementation of coils 1412, 1414, 1418 and 222, according to an embodiment of the present invention. In the embodiment illustrated in FIGS. 15A-15D, coil 1418 includes a single turn (loop). In some embodiments, implementing coil 1418 with a single turn advantageously results in a higher quality factor Q when compared with using more than one turn.

In some embodiments, one or both of coils 1412, 1414 may have a plurality of turns (loops). In some embodiments, one or both of coils 1412, 1414 may be implemented with a single turn.

In some embodiments, coil 222 may be implemented with a single turn. In some embodiments, coil 222 may be implemented with more than one turn.

In some embodiments, the resonance operation of the wireless power system is maximized when the coupling coefficients between the source (e.g., the master TX) and the repeater coil, and between the repeater coil and the load (e.g., 204) is low (e.g., below 0.1). In some embodiments, as such coupling coefficients increase above 0.1, the wireless power transfer system continues to operate safely as an inductive system. Thus, in some embodiments, even though the currents in the repeater coil decrease and the system gets detuned as the coupling coefficient increases above 0.1, the system is still advantageously capable of transferring energy to the load (and produce a sufficiently high voltage $V_{RX}$ to operate safely and properly) since the coupling coefficients between the source and repeater coil and between the repeater coil and the load are higher.

Figure 15A:
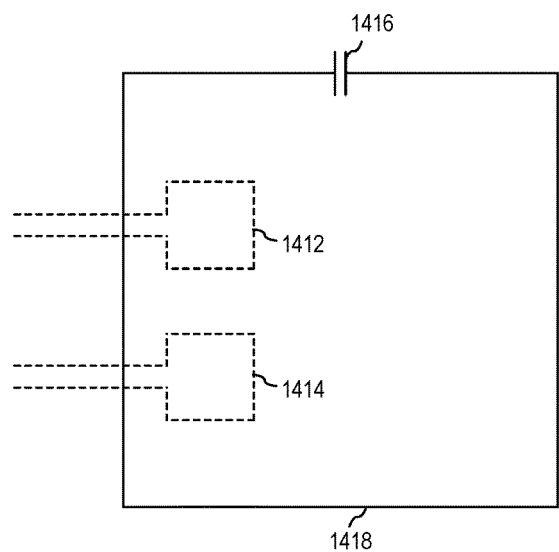
FIGS. 15A-15D illustrate a possible physical implementation of coils of FIG. 14, according to an embodiment of the present invention.

As shown in FIG. 15A, in some embodiments, coils 1412 and 1414 are disposed with respect to coil 1418 such that the area inside each of coils 1412 and 1414 fully overlap with the area inside coil 1418, thereby allowing the magnetic flux induced by currents $I_{TX1}$ and $I_{TX2}$ (respectively flowing through coils 1412 and 1414) to induce current $I_{TX3}$ in coil 1418.

As shown in FIG. 15A, in some embodiments, coil 1418 may be larger than coils 1412 and 1414. By implementing coil 1418 of a different size (e.g., larger) than coils 1412 and 1414, some embodiments advantageously reduce the coupling between coil 1418 and coils 1412 and 1414, thereby advantageously increasing the capability of coil 1418 to resonate.

Figure 15B:
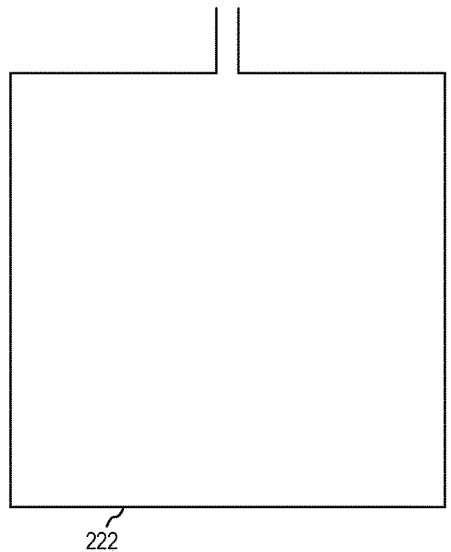

As illustrated in FIGS. 15A and 15B, in some embodiments, coils 1418 and 222 may be of the same size and shape. By having coils 1418 and 222 of the same size and shape, some embodiments advantageously maximize power transfer from coil 1418 to 222 when coils 1418 and 222 are aligned. Other shapes and sizes may be used. For example, in some embodiments, coil 222 may be smaller than coil 1418.

Figure 15C:
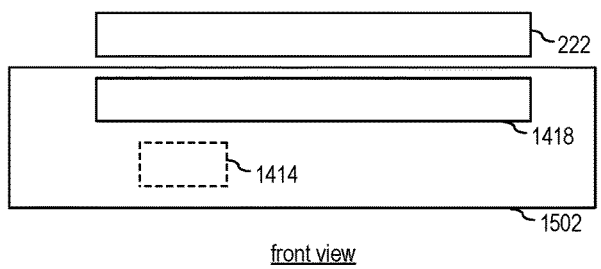
Figure 15D:
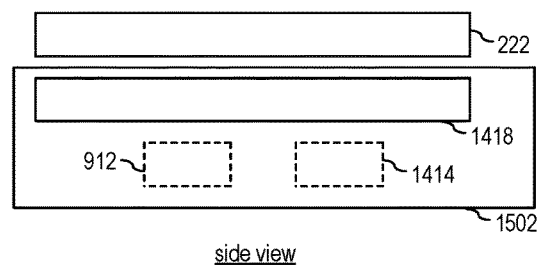

As illustrated in FIGS. 15C and 15D, in some embodiments, coils 1412, 1414 and 1418 may be implemented with traces in different layers of PCB 1502. Other implementations are also possible. For example, one or more of coils 1512, 1514, and 1518 may be implemented with copper wire, stamped copper, stamped aluminum, deposited copper, laser cut copper, etc.

In some embodiments, capacitor 1416 may be implemented as a discrete capacitor. For example, FIGS. 16A-16D illustrate a possible physical implementation of coils 1412, 1414, 1418 and 222, according to an embodiment of the present invention. In the embodiment illustrated in FIGS. 16A-16D, coil 1418 includes a single turn (loop) of copper wire disposed over PCB 1602 and soldered between terminals 1604 and 1606, and capacitor 1416 is implemented as a discrete capacitor soldered between terminals 1604 and 1606. In some embodiments, terminals 1604 and 1606 may be used to measure the voltage across capacitor 1416, e.g., to determine the impedance of coil 1418 during active wireless power transfer (e.g., during step 504).

In some embodiments, additional terminals may be used to allow for voltage measurements to determine the impedance of coil 1418. For example, FIGS. 17A-17D illustrate a possible physical implementation of coils 1412, 1414, 1418 and 222, according to an embodiment of the present invention. In the embodiment illustrated in FIGS. 17A-17D, coil 1418 includes a single turn (loop), and includes copper wire 1701 disposed over PCB 1702 and coupled between terminals 1604 and 1704, trace 1703 coupled between terminals 1704 and 1706, and copper wire 1705 disposed over PCB 1702 and coupled between terminals 1706 and 1606. In some embodiments, terminals 1704 and 1706 may be used to measure a voltage indicative of current $I_{TX3}$ (e.g., by using the, e.g., known/estimated value of inductance of trace 1703) e.g., to determine the impedance of coil 1418 during active wireless power transfer (e.g., during step 504). In some embodiments, one of terminals 1703 or 1705 may be grounded. In some embodiments, none of terminals 1604, 1606, 1704 and 1706 are grounded so that coil 1418 is floating.

Figure 18A:
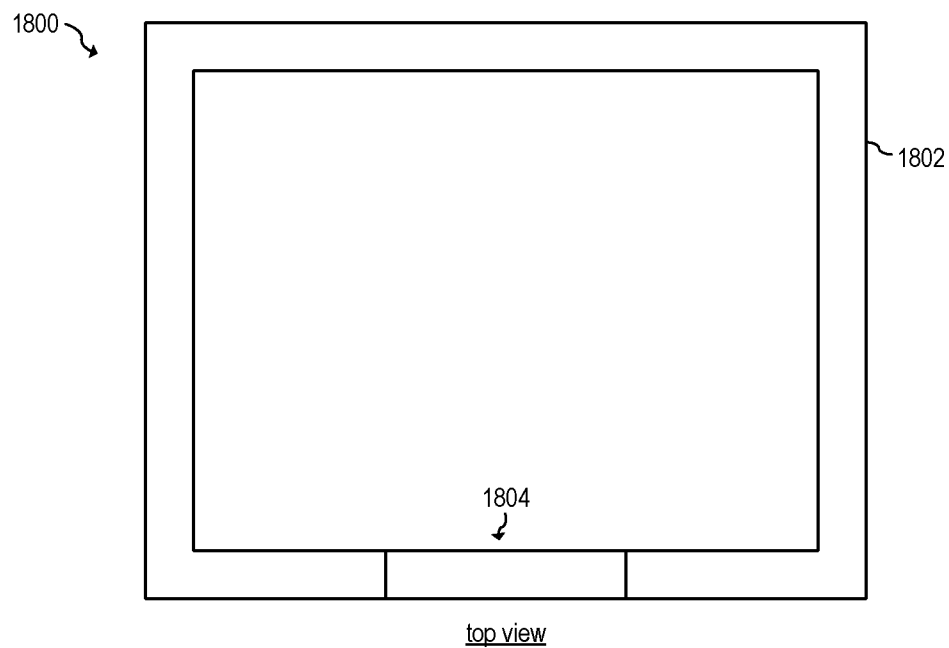
FIGS. 18A and 18B illustrate a self-resonating coil, according to an embodiment of the present invention.
Figure 18B:
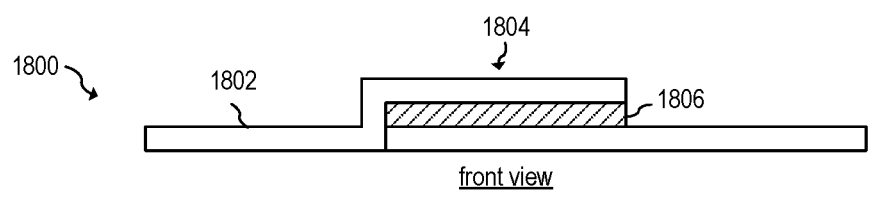

In some embodiments, capacitor 1416 may be implemented with overlapping traces instead of using a physical capacitor so that coil 1418 is a self-resonating coil. For example, FIGS. 18A and 18B illustrate self-resonating coil 1800, according to an embodiment of the present invention. Coil 1418 and capacitor 1416 may be implemented as self-resonating coil 1800.

As shown in FIGS. 18A and 18B, self-resonating coil 1800 includes copper wire 1802 and capacitor 1804. Capacitor 1804 is formed by parallel plates from copper wire 1802 and spacer 1806.

In some embodiments, spacer 1806 is implemented with a dielectric with high voltage capability. For example, in some embodiments, spacer 1806 is implemented with polypropylene film, which advantageously can be manufactured with tight geometric tolerances, thereby advantageously allowing good spacing control, which causes good control of the capacitance of capacitor 1804. In some embodiments, self-resonating coil 1800 may be advantageously use with higher operating frequencies, such as 27 MHz and higher.

Figure 19:
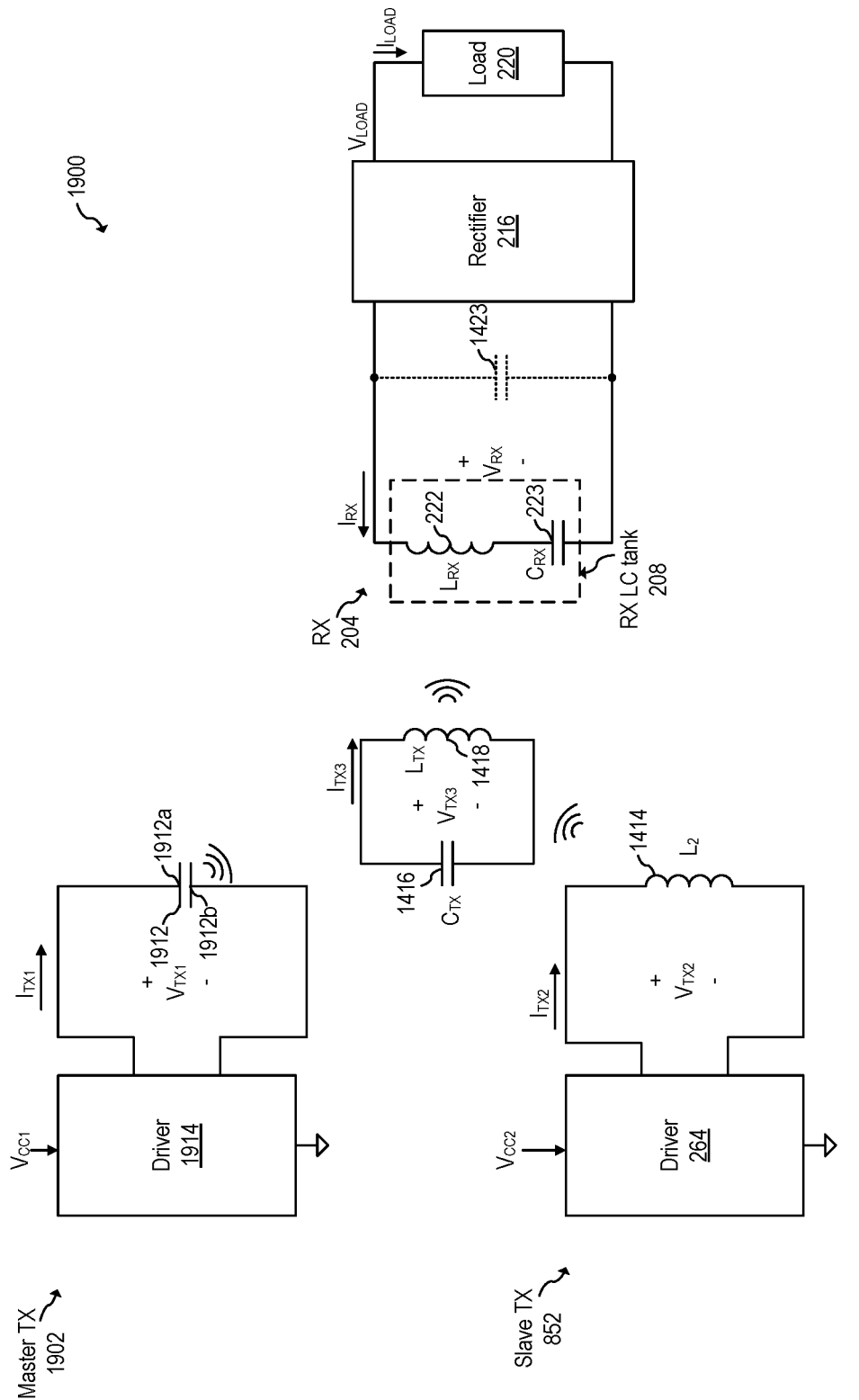
FIG. 19 shows a schematic diagram of a wireless power transfer system, according to an embodiment of the present invention.

FIG. 19 shows a schematic diagram of wireless power transfer system 1900, according to an embodiment of the present invention. Wireless power transfer system 1900 includes master wireless power transmitter 1902, slave wireless power transmitter 852, and wireless power receiver 204. In some embodiments, wireless power transfer system 1900 operates in a similar manner as wireless power transfer system 1400, may be implemented with differential drivers (e.g., as shown in FIG. 9) and may implement methods 500 and 600. Wireless power transfer system 1900, however, capacitively transfers power from capacitor 1912 to capacitor 1416 to induce current $I_{TX3}$ instead of using a coil to magnetically transfer power to coil 1418.

Figure 20A:
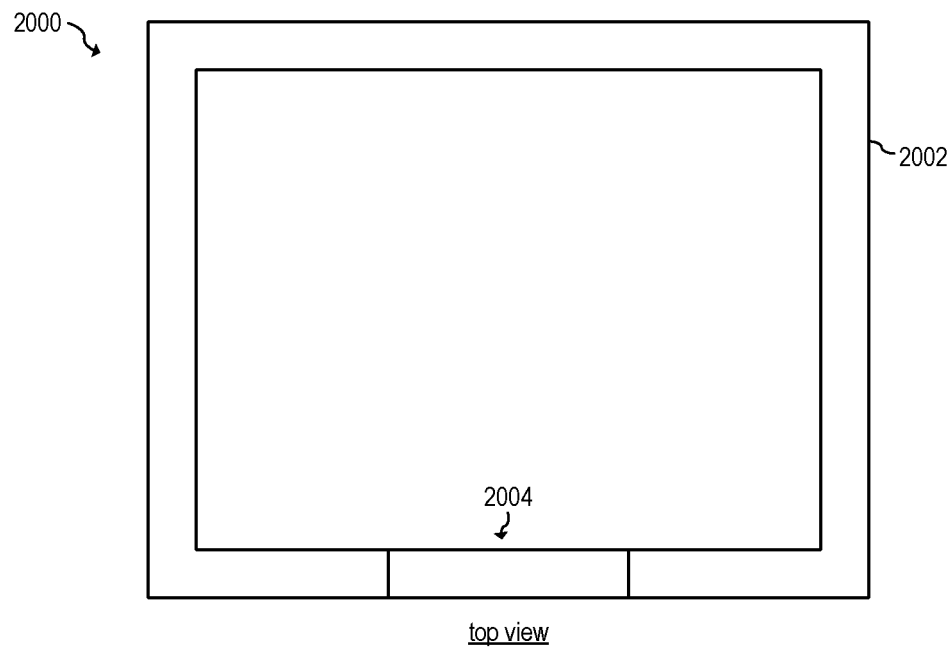
FIGS. 20A and 20B illustrate a self-resonating coil, according to an embodiment of the present invention.
Figure 20B:
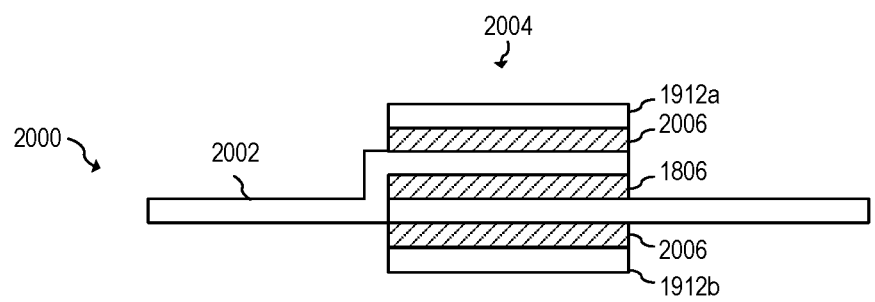

FIGS. 20A and 20B illustrate self-resonating coil 2000, according to an embodiment of the present invention. Coil 1418 and capacitor 1416 may be implemented as self-resonating coil 2000.

Self-resonating coil 2000 may be implemented with copper wire 2002, and may operate in a similar manner as self-resonating coil 1800. Self-resonating coil 2000, however, includes capacitor 2004, which includes capacitor plates of capacitor 1416 and capacitor plates (at respective terminals 1912a and 1912b) of capacitor 1912. In some embodiments, capacitively coupling plates from capacitor 1912 and 1416 (e.g., as shown in FIGS. 20A and 20B) advantageously allows for capacitively transferring power from master TX 1902 to coil 1418, which then magnetically wirelessly transfers power to coil 222.

As shown in FIG. 20B, in some embodiments, the plates of capacitor 1416 are closer to each other than the plates of capacitor 1912, which partially surrounds the plates of capacitor 1416. In some embodiments, such placement allows for capacitor 1418 to have a higher capacitance than capacitor 1912, which may be advantageous since higher capacitance of capacitor 1418 may allow for a lower inductance of coil 1418 and a lower capacitance of capacitor 1912 may not cause a deterioration of performance since wireless power transfer system 1900 may operate properly with low coupling (e.g., with a coupling coefficient below 0.1) between capacitor 1912 and 1416.

In some embodiments, spacer 2006 may be of the same or similar material than spacer 1806, and may be of the same or similar shape (e.g., same or similar thickness) than spacer 1806.

Figure 21:
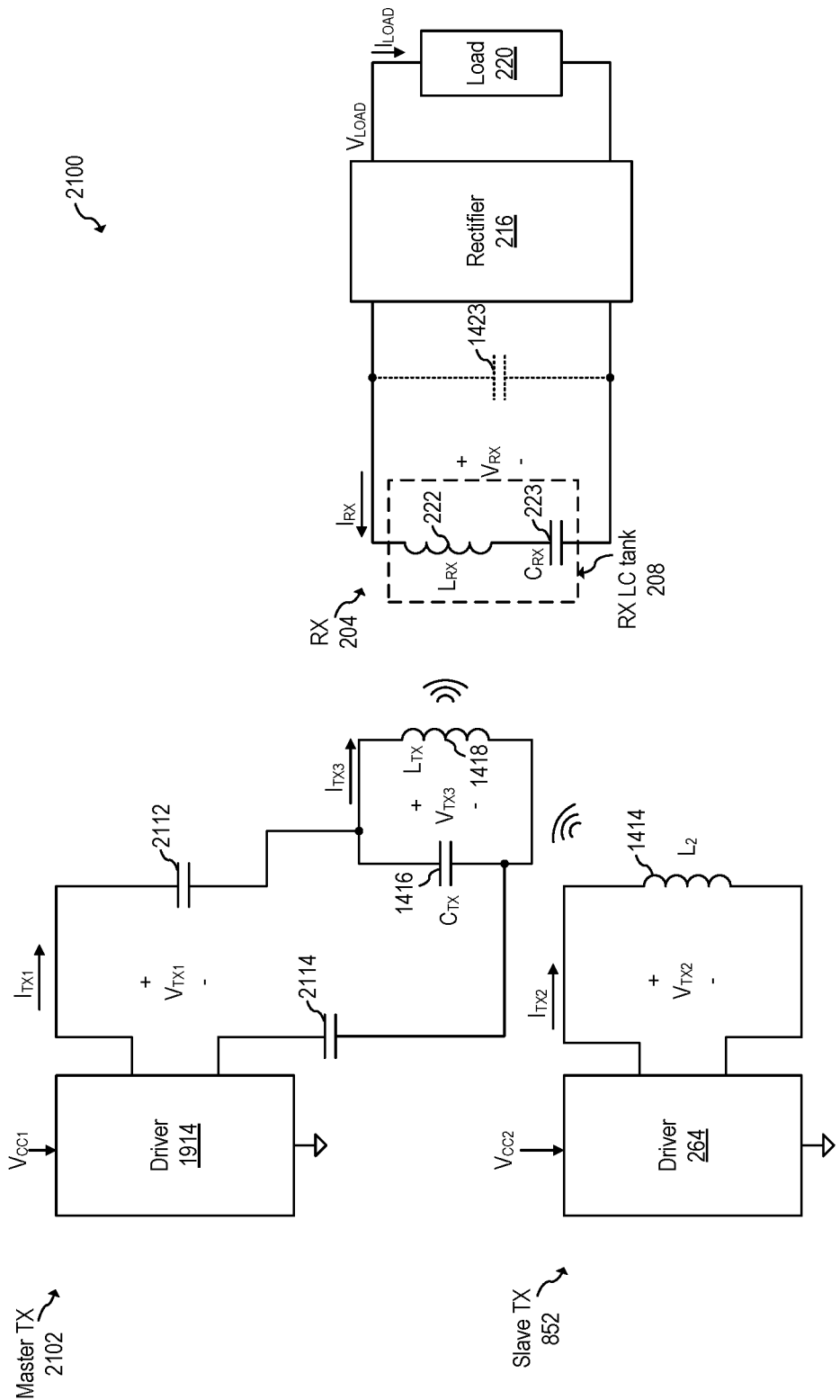
FIG. 21 shows a schematic diagram of a wireless power transfer system, according to an embodiment of the present invention.

FIG. 21 shows a schematic diagram of wireless power transfer system 2100, according to an embodiment of the present invention. Wireless power transfer system 2100 includes master wireless power transmitter 2102, slave wireless power transmitter 852, and wireless power receiver 204. In some embodiments, wireless power transfer system 2100 operates in a similar manner as wireless power transfer system 1900, may be implemented with differential drivers (e.g., as shown in FIG. 9) and may implement methods 500 and 600. Wireless power transfer system 2100, however, capacitively transfers energy from master TX 2102 to capacitor 1416 and coil 1418 using discrete capacitors 2112 and 2114.

In some embodiments, the capacitances of capacitors 2112 and 2114 are smaller than the capacitance of capacitor 1416. Capacitors 2112, 2114 and 1416 operate as a voltage divider which may advantageously allow for coil 1418 and capacitor 1416 to have a high quality factor Q, which may advantageously allow coil 1418 to resonate freely.

The capacitive coupling described in FIGS. 19, 20A, 20B, and 21 may also be implemented and performed, instead of or in addition to by the master TX, by the slave TX (e.g., 852).

Repeater coils (e.g., 1418) coupled to the transmitting coil (e.g., 1418) may change the repeater coil tuning properties in the presence of a receiver (e.g., 204), e.g., due to the presence of ferrite materials.

In an embodiment of the present invention, a wireless power transmission system includes a plurality of partially overlapping repeater coils coupled to the transmitting coil. The repeater coils are designed to be detuned (designed to not react to the operating frequency of the master TX) when not in the presence of a receiver. Thus, in some embodiments, when not subjected to the influence of a receiver, the repeater coils do not transfer power. When a receiver is placed in the charging area, the repeater coil closest to the receiver is tuned (e.g., due to the presence of the receiver, such as due to the presence of the ferrite material of the receiver) and acts as a guide for the magnetic field generated by the transmitting coil to channel the (e.g., most or all of the) energy from the transmitting coil to the receiving coil of the receiver. Other repeater coils not close to the receiver are not (e.g., substantially) affected by the presence of the receiver and remain detuned. By using a plurality of overlapping detuned repeater coils, some embodiments passively guide the magnetic field from the transmitting coil to the receiving coil to wirelessly transfer power to the receiver without strict alignment requirements for the receiving coil.

Figure 22:
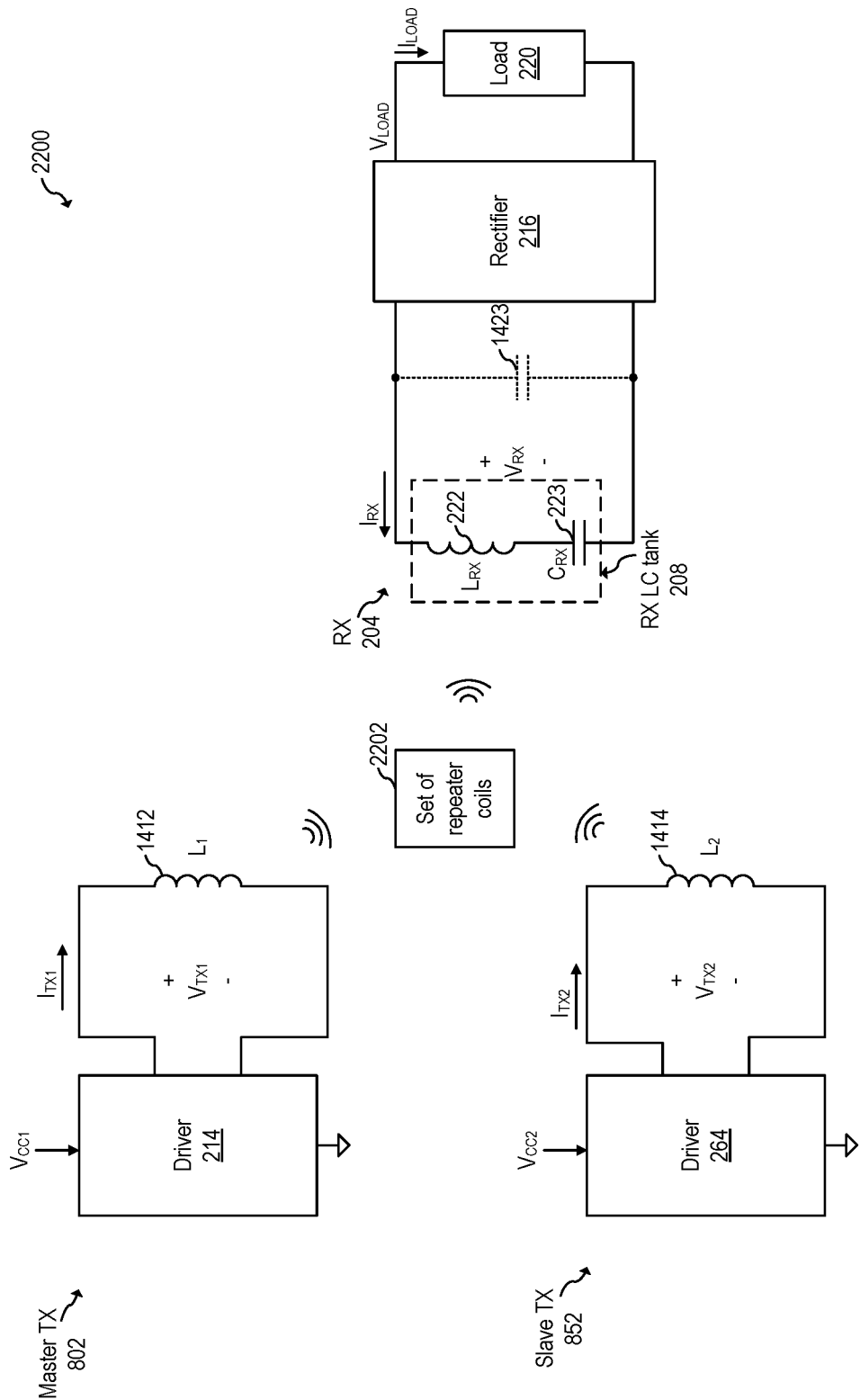
FIG. 22 shows a schematic diagram of a wireless power transfer system, according to an embodiment of the present invention.

FIG. 22 shows a schematic diagram of wireless power transfer system 2200, according to an embodiment of the present invention. As shown in FIG. 22, wireless power transfer system 2200 is similar manner to wireless power transfer system 1400. Wireless power transfer system 222, however, includes set of repeater coils 2202 instead of a single repeater coil 1418.

In some embodiments, the set of repeater coils 2202 includes a plurality of (e.g., identical) repeater coils (e.g., in an array/grid arrangement). In some embodiments, the repeater coils of the set 2202 are designed to be detuned when not in the presence of wireless power receiver 204 (e.g., when the wireless power receiver 204 is not within a charging area of the set of 2202, such as within 6 inches of the set 2202). The charging area of set 2202 may be understood as the area within which a receiver is capable of receiving sufficient power from the set 2202 so as to operate properly (e.g., transmit information in-band through set 2202, power a load of receiver 204, etc.).

When wireless power receiver 204 is near (e.g., within 6 inches) one of the repeater coils of the set 2202, such one repeater coil is automatically tuned by the effect of the ferrite material of wireless power receiver 204, and guides the magnetic field from coil 1412 to coil 222 while the rest of the repeater coils remain (e.g., substantially) detuned. Once one of the repeater coils of the set 2202 is tuned, wireless power transfer system 2200 operates in a similar manner as wireless power transfer system 1400.

In some embodiments, capacitance $C_{TX}$ of capacitor 1416 is variable (e.g., using variable capacitors or a capacitor bank) and the repeater coil closest to wireless power receiver 204 is actively tuned (e.g., by controller 230) by changing the capacitance $C_{TX}$ of the capacitor 1416 associated with such repeater coil closest to the wireless power receiver 204. In some such embodiments, controller 230 may determined which repeater coil of the set 2302 is the closest, e.g., based on the voltage $V_{TX3}$ (e.g., the highest voltage $V_{TX3}$ is the closest to receiver 204) and/or based on the current $I_{TX3}$ (e.g., the highest voltage $I_{TX3}$ is the closest to receiver 204).

In some embodiments, coil 1412 is bigger than each of the repeater coils of the set 2202. For example, in some embodiments, coil 1414 and the repeater coils of the set 2202 are disposed inside the perimeter of coil 1412.

Figure 23:
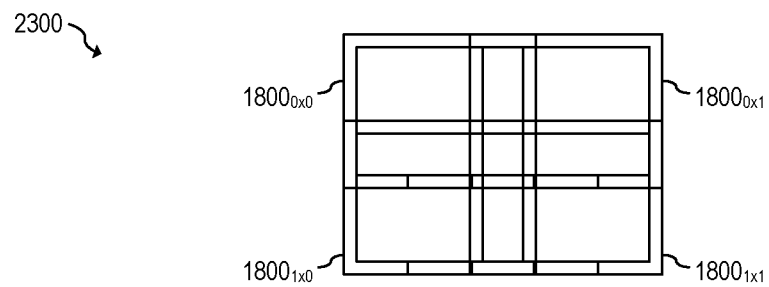
FIG. 23 illustrates a set of repeating coils, according to an embodiment of the present invention.

FIG. 23 illustrates set 2300 of repeating coils 1800, according to an embodiment of the present invention. Set 2202 may be implemented as set 2300.

As shown in FIG. 23, set 2300 includes 4 self-resonating coils 1800 that are partially overlapping in a grid arrangement. In some embodiments, more than 4 repeating coils (e.g., 8, 10, etc.) or less than 4 (e.g., 3 or 2) may also be used.

Figure 16A:
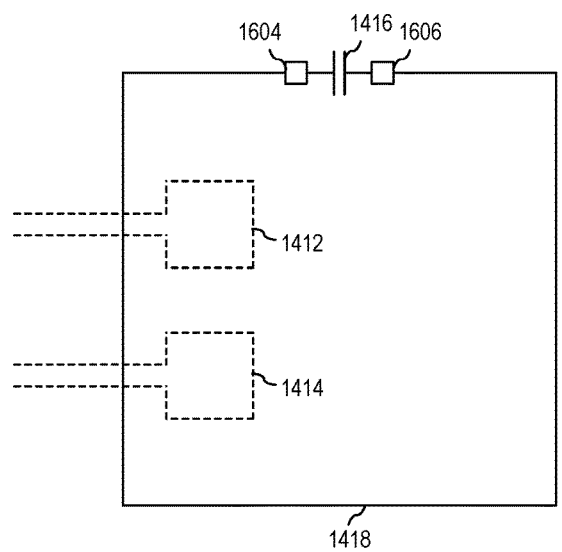
FIGS. 16A-16D illustrate a possible physical implementation of coils of FIG. 14, according to an embodiment of the present invention.
Figure 16B:
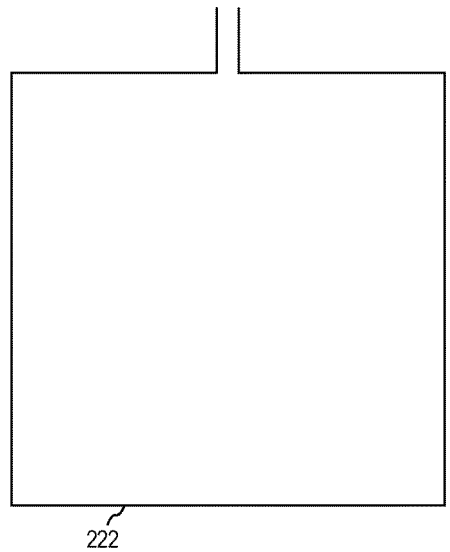
Figure 16C:
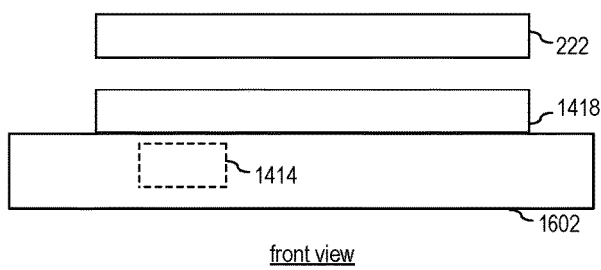
Figure 16D:
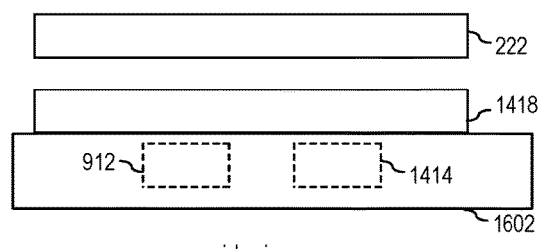
Figures 17A, 17B:
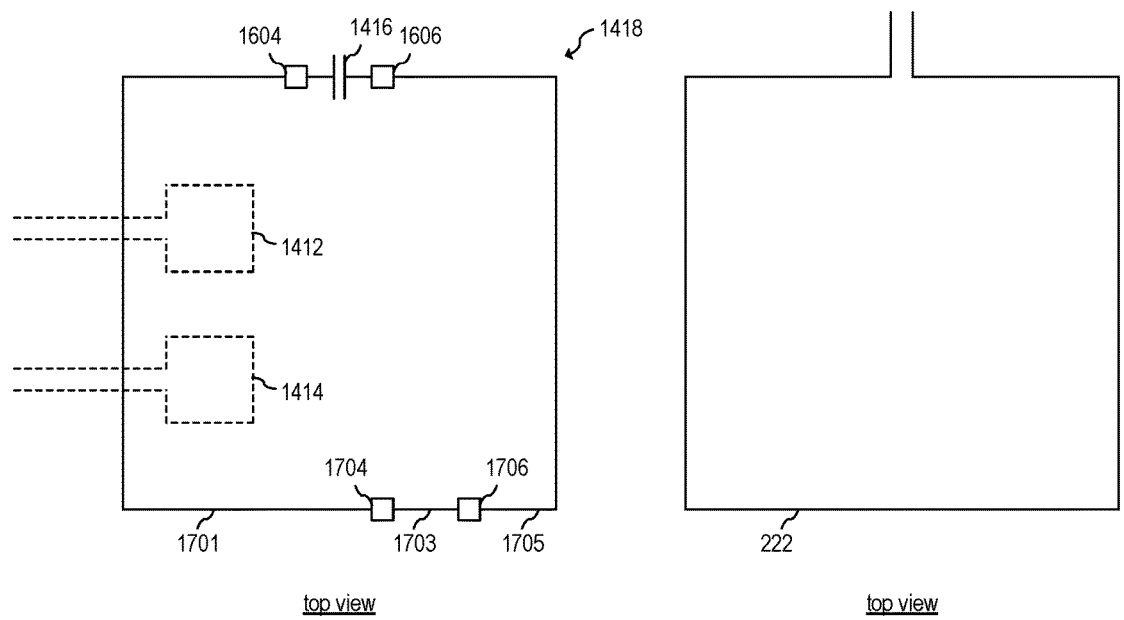
FIGS. 17A-17D illustrate a possible physical implementation of coils of FIG. 14, according to an embodiment of the present invention.
Figures 17C, 17D:
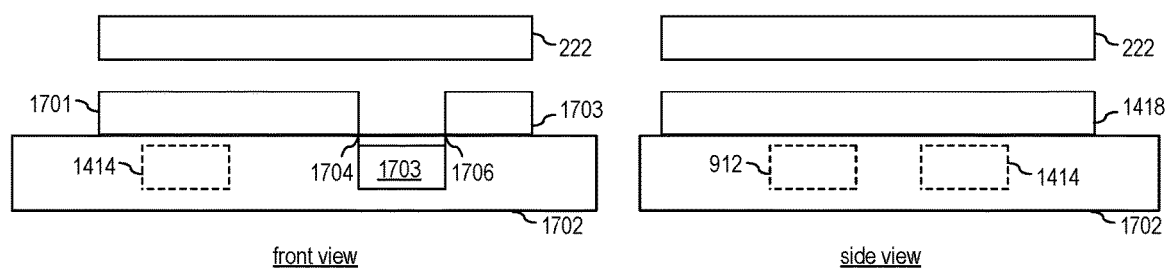

As shown in FIG. 23, set 2300 is implemented with a plurality of self-resonating coils. In some embodiments, the repeating coils of set 2300 may be implemented with discrete capacitors (e.g., as shown in FIGS. 16A, 16C, and 16D). Other implementations are also possible.

Figure 24:
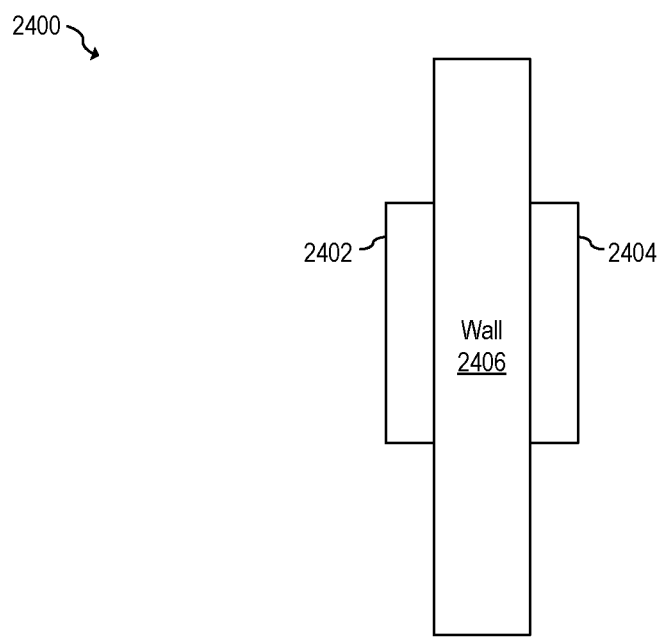
FIG. 24 shows a receiver device being powered by a transmitter device through a wall, according to an embodiment of the present invention.

FIG. 24 shows receiver device 2404 being powered by transmitter device 2402 through wall 2406, according to an embodiment of the present invention.

In some embodiments, receiver device 2404 may be, e.g., a doorbell. In some embodiments, receiver device 2404 may be implemented as other fixed devices, such as a smart thermostat, or as a mobile device, such as a mobile phone, for example.

In some embodiments, receiver device 2404 includes a wireless power receiver, such as wireless power receiver 204, 1000, 1100, or 1200.

In some embodiments, transmitter device 2402 includes a master TX (e.g., 202, 802, 902, 1902, 2102) and a slave TX (e.g., 252, 852, 952). In some embodiments, transmitter device 2402 includes a transformer (e.g., 801, 1401) or repeater coil (e.g., 1418) for transferring power to the wireless power receiver of receiver device 2404. In some embodiments, transmitter device 2402 includes set 2202 of repeater coils.

In some embodiments, wall 2406 is an exterior wall of a building. In some embodiments, wall 2406 is an interior wall of a building. In some embodiments, wall 2406 is omitted. In some embodiments, another element (different from a wall) is disposed between transmitter device 2402 and receiver device 2404, such as a table, mat, etc.

Example embodiments of the present invention are summarized here. Other embodiments can also be understood from the entirety of the specification and the claims filed herein.

Example 1. A wireless power transmitter including: a master transmitter resonant tank configured to wirelessly transmit power to a receiver resonant tank; a master transmitter driver configured to drive the master transmitter resonant tank; a slave transmitter resonant tank; a slave transmitter driver configured to drive the slave transmitter resonant tank; and a controller configured to adjust an impedance seen by the master transmitter resonant tank by controlling the slave transmitter driver, where controlling the slave transmitter driver includes adjusting a phase angle between a slave transmitter current flowing through the slave transmitter resonant tank and a master transmitter current flowing through the master transmitter resonant tank or adjusting a slave supply voltage of the slave transmitter driver.

Example 2. The wireless power transmitter of example 1, where the controller is configured to adjust the phase angle between the slave transmitter current flowing through the slave transmitter resonant tank and the master transmitter current flowing through the master transmitter resonant tank to adjust the impedance seen by the master transmitter resonant tank.

Example 3. The wireless power transmitter of one of examples 1 or 2, where the controller is configured to adjust the slave supply voltage of the slave transmitter driver to adjust the impedance seen by the master transmitter resonant tank.

Example 4. The wireless power transmitter of one of examples 1 to 3, where the master transmitter resonant tank or the slave transmitter resonant tank includes a self-resonating coil.

Example 5. The wireless power transmitter of one of examples 1 to 4, where the master transmitter resonant tank includes a first transmitting coil, where the slave transmitter resonant tank includes a second transmitting coil, and where the coupling coefficient between the first and second transmitting coils is lower than 0.1.

Example 6. The wireless power transmitter of one of examples 1 to 5, where the master transmitter resonant tank includes a first transmitting coil, and where the slave transmitter resonant tank includes a second transmitting coil, the wireless power transmitter further including a third transmitting coil configured to: receive power from the first transmitting coil; and transmit power to the receiver resonant tank.

Example 7. The wireless power transmitter of one of examples 1 to 6, further including a physical transformer including the first, second and third transmitting coils.

Example 8. The wireless power transmitter of one of examples 1 to 7, where the first, second, and third transmitting coils form an air transformer.

Example 9. The wireless power transmitter of one of examples 1 to 8, where the third transmitting coil is a self-resonating coil.

Example 10. The wireless power transmitter of one of examples 1 to 9, where the third transmitting coil includes copper wire, and where the first and second transmitting coils are implemented with traces in a printed circuit board (PCB).

Example 11. The wireless power transmitter of one of examples 1 to 10, where the third transmitting coil includes a trace in the PCB.

Example 12. The wireless power transmitter of one of examples 1 to 11, where the first transmitting coil is smaller than the third transmitting coil, and where the second transmitting coil is smaller than the third transmitting coil.

Example 13. The wireless power transmitter of one of examples 1 to 12, where the third transmitting coil is a floating coil.

Example 14. The wireless power transmitter of one of examples 1 to 13, where the master transmitter resonant tank includes a first transmitting coil, and where the slave transmitter resonant tank includes a second transmitting coil, the wireless power transmitter further including a plurality of partially overlapping repeater coils configured to receive power from the first transmitting coil and transmit power to the receiver resonant tank.

Example 15. The wireless power transmitter of one of examples 1 to 14, where each of the plurality of repeater coils is a self-resonating coil.

Example 16. The wireless power transmitter of one of examples 1 to 15, where each of the plurality of repeater coils is configured to be detuned when the receiver resonant tank is not within a charging area of the plurality of repeater coils.

Example 17. The wireless power transmitter of one of examples 1 to 16, where the controller is configured to detect one repeater coil of the plurality of repeater coils that is closer to the receiver resonant tank and tune the one repeater coil.

Example 18. A wireless power receiver including: a receiver resonant tank configured to wirelessly receive power from a transmitter resonant tank; a tunable capacitor coupled to the receiver resonant tank, the tunable capacitor having a default capacitance; a rectifier coupled to the receiver resonant tank and to the tunable capacitor; a boost converter coupled to an output of the rectifier; and a controller, where, during startup, the boost converter is configured to power the controller, and the controller is configured to adjust the tunable capacitor to move a resonance frequency towards an operating frequency of a transmitter current flowing through the transmitter resonant tank, where the controller is configured to turn off the boost converter after adjusting the tunable capacitor.

Example 19. The wireless power receiver of example 18, where the tunable capacitor includes a capacitor coupled across the receiver resonant tank.

Example 20. The wireless power receiver of one of examples 18 or 19, where the receiver resonant tank includes a receiving coil coupled in series with a resonant capacitor, where the tunable capacitor is coupled between the receiving coil and a reference terminal, the wireless power receiver further including a further tunable capacitor coupled between the resonant capacitor and the reference terminal.

Example 21. A controller configured to be coupled to a master transmitter driver for driving a master transmitter resonant tank and to a slave transmitter driver for driving a slave transmitter resonant tank, the controller configured to: cause a change in an amplitude of a slave current flowing through the slave transmitter resonant tank or a change in phase of the slave current with respect to a master current flowing through the master transmitter resonant tank so as to cause a change in phase angle between the master current and a master voltage across the master transmitter resonant tank and a change in absolute value of the master voltage over the master current.

Example 22. A method including: wirelessly transmitting power to a receiver resonant tank of a wireless power receiver by driving a master transmitter resonant tank; determining a master impedance associated with the master transmitter resonant tank; and adjusting a phase angle between a slave transmitter current flowing through a slave transmitter resonant tank and a master transmitter current flowing through the master transmitter resonant tank or adjusting a slave voltage across the slave transmitter resonant tank to cause a change in the master impedance towards a target impedance.

Example 23. The method of example 22, further including: causing a change in the master transmitter current or a master transmitter voltage across the master transmitter resonant tank based on a target power transmission level; determining whether the master transmitter current is within a predetermined current range; and determining whether the master transmitter voltage is within a predetermined voltage range, where adjusting the phase angle between the slave transmitter current and the master transmitter current or adjusting the slave voltage includes adjusting the phase angle between the slave transmitter current and the master transmitter current or adjusting the slave voltage in response to the master transmitter current being outside the predetermined current range or the master transmitter voltage being outside the predetermined voltage range.

Example 24. The method of one of examples 22 or 23, where wirelessly transmitting power to the receiver resonant tank includes wirelessly transmitting power from the master transmitter resonant tank to a repeater coil, and wirelessly transmitting power from the repeater coil to the receiver resonant tank.

Example 25. The method of one of examples 22 to 24, where the wireless power receiver further includes a capacitor coupled across the receiver resonant tank.

Example 26. A wireless power transmitter including: a master transmitter resonant tank; a master transmitter driver configured to drive the master transmitter resonant tank; a slave transmitter resonant tank; a slave transmitter driver configured to drive the slave transmitter resonant tank; a repeater coil configured to receive energy from the master transmitter resonant tank and wirelessly transmit power to a receiver resonant tank; and a controller configured to adjust an impedance associated with the repeater coil by controlling the slave transmitter driver, where controlling the slave transmitter driver includes adjusting a phase angle between a slave transmitter current flowing through the slave transmitter resonant tank and a repeater current flowing through the repeater coil or adjusting a slave supply voltage of the slave transmitter driver.

Example 27. The wireless power transmitter of example 26, where the repeater coil includes copper wire and a printed circuit board (PCB) trace in a PCB, and where the controller is configured to determine the impedance associated with the repeater coil based on a voltage across the PCB trace.

Example 28. A wireless power transmitter including: a master transmitter driver configured to drive a master energy storage element; a slave transmitter driver configured to drive a slave energy storage element; a repeater coil configured to receive energy from the master transmitter driver via the master energy storage element and wirelessly transmit power to a receiver resonant tank; and a controller configured to adjust an impedance associated with the master energy storage element or the repeater coil by controlling the slave transmitter driver, where controlling the slave transmitter driver includes adjusting a phase angle between a slave transmitter current flowing through the slave energy storage element and a master transmitter current flowing through the master energy storage element, adjusting a phase angle between the slave transmitter current and a master repeater current flowing through the repeater coil, or adjusting a slave supply voltage of the slave transmitter driver.

Example 29. The wireless power transmitter of example 28, where the master energy storage element includes a first capacitor that is capacitively coupled to the repeater coil.

Example 30. The wireless power transmitter of one of examples 28 or 29, where the repeater coil includes overlapping plates that form a resonant capacitor, and where the first capacitor includes first capacitor plates capacitively coupled to the overlapping plates of the resonant capacitor.

Example 31. The wireless power transmitter of one of examples 28 to 30, where the overlapping plates of the resonant capacitor are coupled between the first capacitor plates of the first capacitor, separated by respective spacers.

Example 32. The wireless power transmitter of one of examples 28 to 31, where the master energy storage element includes a master coil.

Example 33. The wireless power transmitter of one of examples 28 to 32, where the master energy storage element includes a capacitor coupled in series with the master coil.

Example 34. A device including: a receiver resonant tank; a master transmitter resonant tank; a master transmitter driver configured to drive the master transmitter resonant tank; a slave transmitter resonant tank; a slave transmitter driver configured to drive the slave transmitter resonant tank; a repeater coil configured to receive energy from the master transmitter resonant tank and wirelessly transmit power to a receiver resonant tank; and a controller configured to adjust an impedance seen by the master transmitter resonant tank or an impedance associated with the repeater coil by controlling the slave transmitter driver, where controlling the slave transmitter driver includes adjusting a phase angle between a slave transmitter current flowing through the slave transmitter resonant tank and a master transmitter current flowing through the master transmitter resonant tank, adjusting a phase angle between the slave transmitter current and a master repeater current flowing through the repeater coil, or adjusting a slave supply voltage of the slave transmitter driver.

Example 35. The device of example 34, where the device is a doorbell system.

Example 36. A wireless power transmitter including: a master transmitter resonant tank; a master transmitter driver configured to drive the master transmitter resonant tank; and a plurality of partially overlapping repeater coils configured to receive power from the master transmitter resonant tank and transmit power to a receiver resonant tank, where each of the plurality of repeater coils is configured to be detuned when the receiver resonant tank is not within a charging area of the plurality of repeater coils.

Example 37. The wireless power transmitter of example 36, further including a controller configured to detect one repeater coil of the plurality of repeater coils that is closer to the receiver resonant tank and tune the one repeater coil.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A wireless power transmitter comprising:
    a master transmitter resonant tank configured to wirelessly transmit power to a receiver resonant tank;
    a master transmitter driver configured to drive the master transmitter resonant tank;
    a slave transmitter resonant tank;
    a slave transmitter driver configured to drive the slave transmitter resonant tank; and
    a controller configured to adjust an impedance seen by the master transmitter resonant tank by controlling the slave transmitter driver, wherein controlling the slave transmitter driver comprises adjusting a phase angle between a slave transmitter current flowing through the slave transmitter resonant tank and a master transmitter current flowing through the master transmitter resonant tank or adjusting a slave supply voltage of the slave transmitter driver.

2. The wireless power transmitter of claim 1, wherein the controller is configured to adjust the phase angle between the slave transmitter current flowing through the slave transmitter resonant tank and the master transmitter current flowing through the master transmitter resonant tank to adjust the impedance seen by the master transmitter resonant tank.

3. The wireless power transmitter of claim 1, wherein the controller is configured to adjust the slave supply voltage of the slave transmitter driver to adjust the impedance seen by the master transmitter resonant tank.

4. The wireless power transmitter of claim 1, wherein the master transmitter resonant tank or the slave transmitter resonant tank comprises a self-resonating coil.

5. The wireless power transmitter of claim 1, wherein the master transmitter resonant tank comprises a first transmitting coil, wherein the slave transmitter resonant tank comprises a second transmitting coil, and wherein the coupling coefficient between the first and second transmitting coils is lower than 0.1.

6. The wireless power transmitter of claim 1, wherein the master transmitter resonant tank comprises a first transmitting coil, and wherein the slave transmitter resonant tank comprises a second transmitting coil, the wireless power transmitter further comprising a third transmitting coil configured to:
    receive power from the first transmitting coil; and
    transmit power to the receiver resonant tank.

7. The wireless power transmitter of claim 6, further comprising a physical transformer comprising the first, second and third transmitting coils.

8. The wireless power transmitter of claim 6, wherein the first, second, and third transmitting coils form an air transformer.

9. The wireless power transmitter of claim 6, wherein the third transmitting coil is a self-resonating coil.

10. The wireless power transmitter of claim 6, wherein the third transmitting coil comprises copper wire, and wherein the first and second transmitting coils are implemented with traces in a printed circuit board (PCB).

11. The wireless power transmitter of claim 10, wherein the third transmitting coil comprises a trace in the PCB.

12. The wireless power transmitter of claim 6, wherein the first transmitting coil is smaller than the third transmitting coil, and wherein the second transmitting coil is smaller than the third transmitting coil.

13. The wireless power transmitter of claim 6, wherein the third transmitting coil is a floating coil.

14. The wireless power transmitter of claim 1, wherein the master transmitter resonant tank comprises a first transmitting coil, and wherein the slave transmitter resonant tank comprises a second transmitting coil, the wireless power transmitter further comprising a plurality of partially overlapping repeater coils configured to receive power from the first transmitting coil and transmit power to the receiver resonant tank.

15. The wireless power transmitter of claim 14, wherein each of the plurality of repeater coils is a self-resonating coil.

16. The wireless power transmitter of claim 14, wherein each of the plurality of repeater coils is configured to be detuned when the receiver resonant tank is not within a charging area of the plurality of repeater coils.

17. The wireless power transmitter of claim 16, wherein the controller is configured to detect one repeater coil of the plurality of repeater coils that is closer to the receiver resonant tank and tune the one repeater coil.

* * * * *